United States Patent
Katakura

(10) Patent No.: US 10,101,575 B2
(45) Date of Patent: Oct. 16, 2018

(54) ENDOSCOPE OBJECTIVE OPTICAL SYSTEM

(71) Applicant: OLYMPUS CORPORATION, Tokyo (JP)

(72) Inventor: Masahiro Katakura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/019,264

(22) Filed: Feb. 9, 2016

(65) Prior Publication Data

US 2016/0154230 A1  Jun. 2, 2016

Related U.S. Application Data

(63) Continuation of application No. PCT/JP2014/071652, filed on Aug. 19, 2014.

(30) Foreign Application Priority Data

Aug. 22, 2013  (JP) .................................. 2013-172239

(51) Int. Cl.
*G02B 23/24* (2006.01)
*G02B 15/177* (2006.01)
(Continued)

(52) U.S. Cl.
CPC ............. *G02B 23/243* (2013.01); *G02B 9/12* (2013.01); *G02B 15/173* (2013.01); *G02B 15/177* (2013.01); *G02B 23/2438* (2013.01)

(58) Field of Classification Search
CPC ........................... G02B 23/342; G02B 23/2438
(Continued)

(56) References Cited

U.S. PATENT DOCUMENTS 4,312,572 A * 1/1982 Yamashita ............. G02B 13/24
  359/676
7,907,352 B2 * 3/2011 Miyano ................ G02B 23/243
  359/754
(Continued)

FOREIGN PATENT DOCUMENTS

JP  2007-249189  9/2007
JP  2007-334291  12/2007
(Continued)

OTHER PUBLICATIONS

International Search Report, dated Oct. 7, 2014, issued in corresponding International Application No. PCT/JP2014/071652.
(Continued)

*Primary Examiner* — Zachary Wilkes
(74) *Attorney, Agent, or Firm* — Hunton Andrews Kurth LLP

(57) ABSTRACT

This endoscope objective optical system is capable of acquiring images of high resolution and wide angle of observation field, maintaining low invasiveness and appropriately correcting various aberrations. This optical system has at least a first cemented lens which has a positive lens and a negative lens, in which the cemented lens satisfies the following conditional expressions: (1) $15.0 < \nu A - ndA < 15.75$ and (2) $-0.2 > rdyA1/ih > -20$, wherein $\nu A$ is an Abbe number of the negative lens, $ndA$ is a refractive index of the negative lens at the d-line, $rdyA1$ is a curvature radius of a joining surface of the negative lens, and $ih$ is an image height.

3 Claims, 40 Drawing Sheets

(51) Int. Cl.
  *G02B 9/12* (2006.01)
  *G02B 15/173* (2006.01)

(58) Field of Classification Search
  USPC .................. 359/661, 684, 689, 693, 682
  See application file for complete search history.

(56) References Cited

U.S. PATENT DOCUMENTS

| 2010/0020408 A1 | 1/2010 | Noguchi |
| 2011/0285896 A1 | 11/2011 | Mihara |
| 2013/0100335 A1 | 4/2013 | Nanba |
| 2013/0137930 A1 | 5/2013 | Menabde et al. |

FOREIGN PATENT DOCUMENTS

| JP | 2008-257108 | 10/2008 |
| JP | 2009-265569 | 11/2009 |
| JP | 2010-032680 | 2/2010 |
| JP | 2011-017918 | 1/2011 |
| JP | 2011-247949 | 12/2011 |
| JP | 2013-088737 | 5/2013 |
| JP | 2013-101238 | 5/2013 |
| JP | 2013-114261 | 6/2013 |
| WO | 2011-070897 | 6/2011 |
| WO | 2013/065294 | 5/2013 |

OTHER PUBLICATIONS

Japanese Office Action, dated Jun. 3, 2015, issued in corresponding Japanese Patent Application No. 2015-512940.
"Chromatic Aberrations", Handbook of Optical Systems, vol. 3, Aberration Theory and Correction of Optical Systems, pp. 268-289; published by Wiley-VCH, Apr. 2007. XP002619942. ISBN 978-3-527-40379-0.
Extended European Search Report, dated Feb. 14, 2017, from corresponding European Application No. 14838726.9.

\* cited by examiner

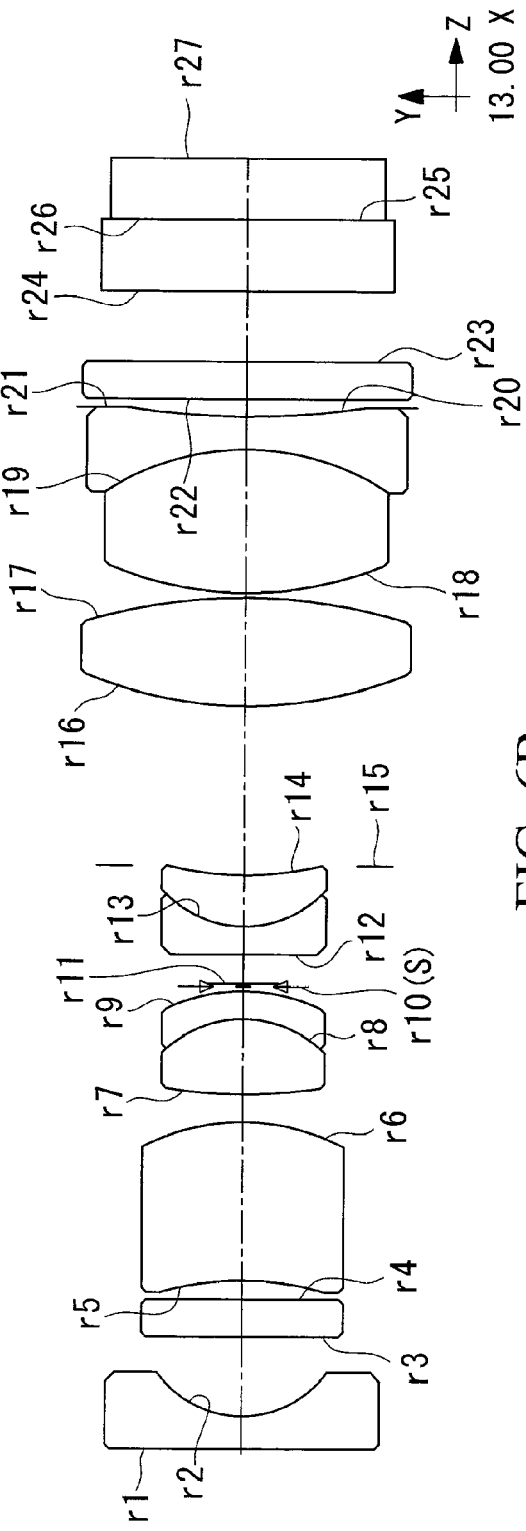
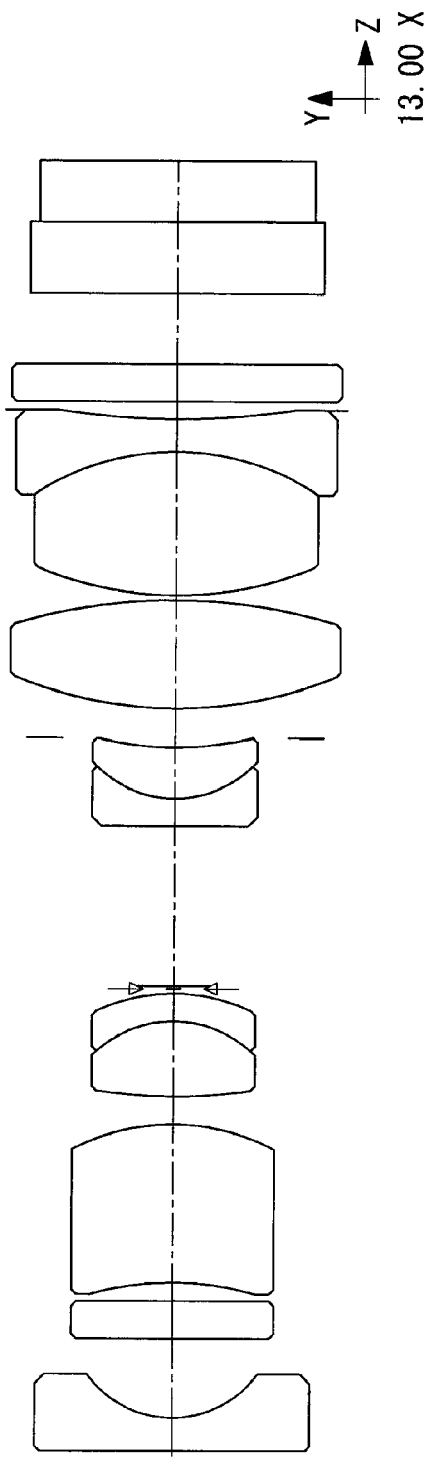
FIG. 6A
FIG. 6B

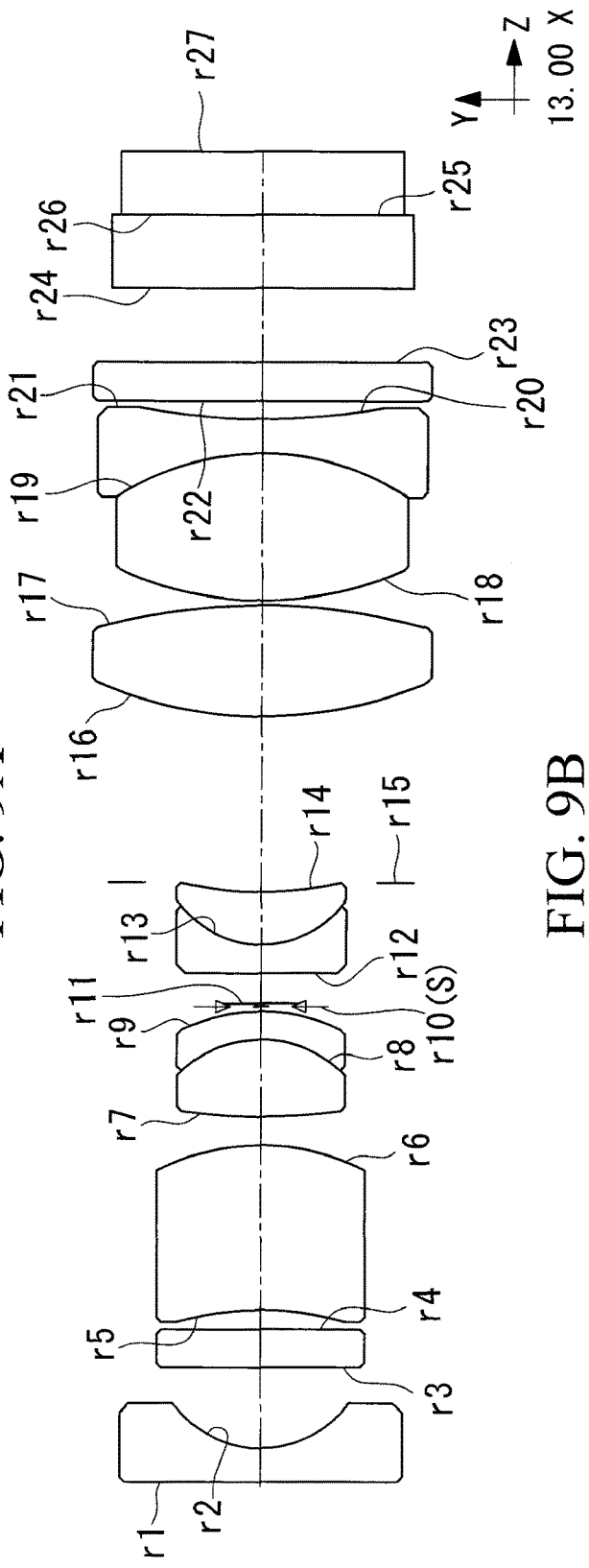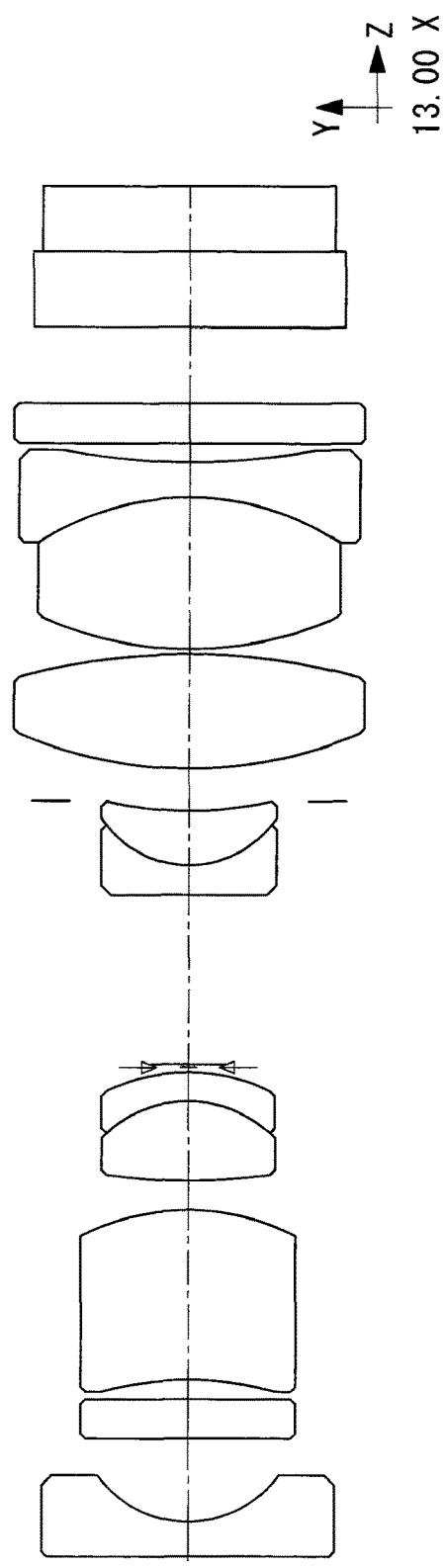

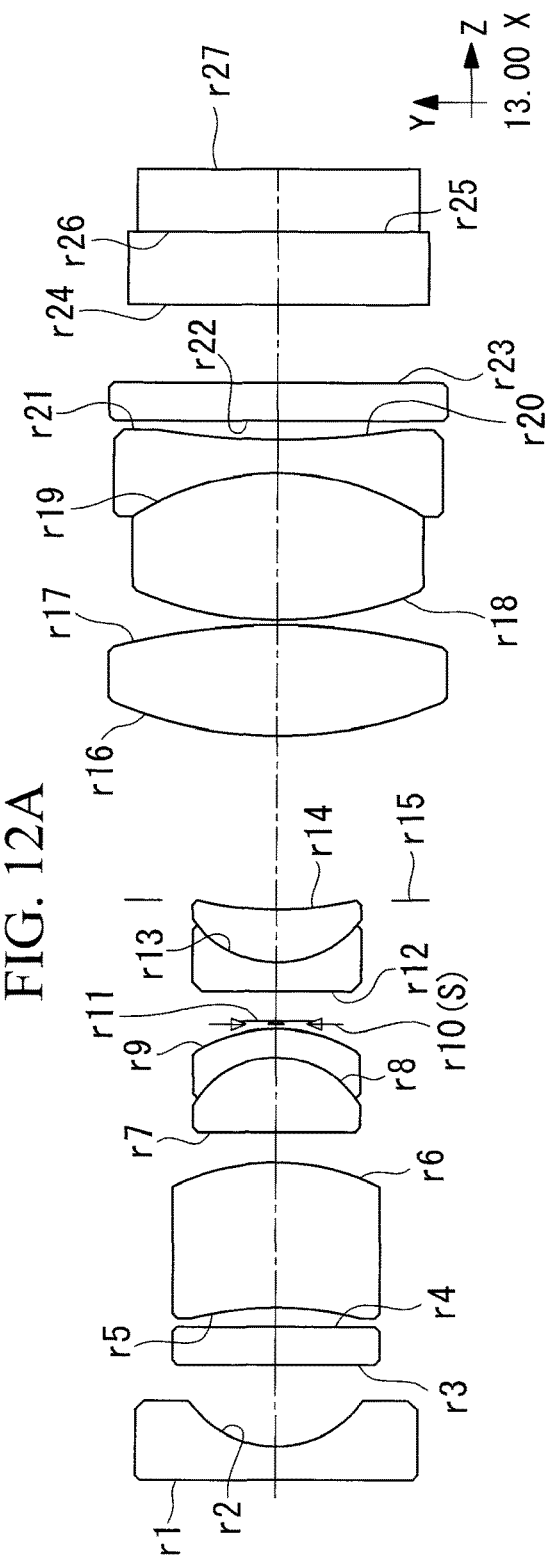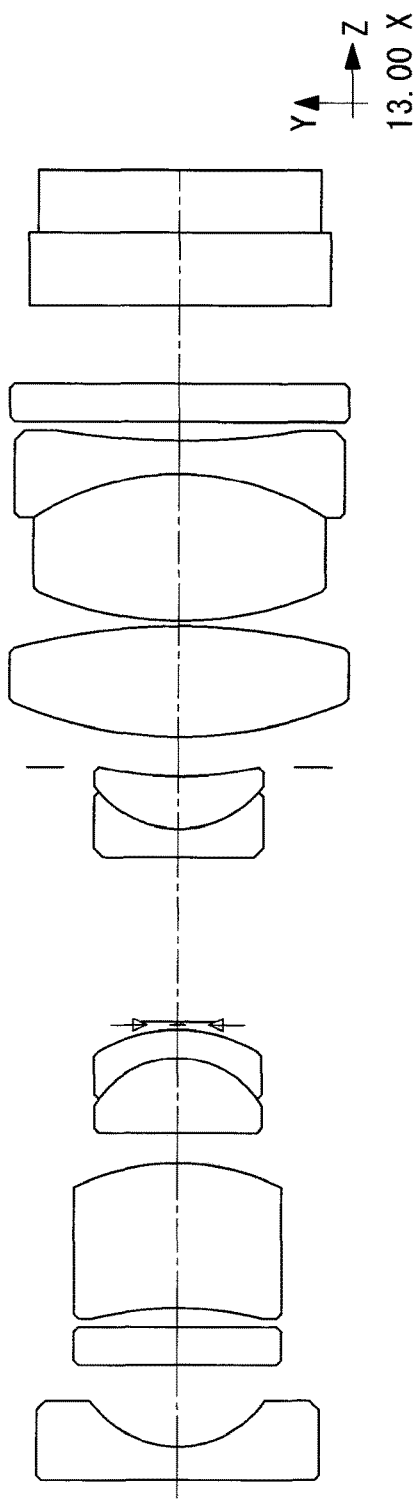
FIG. 12A
FIG. 12B

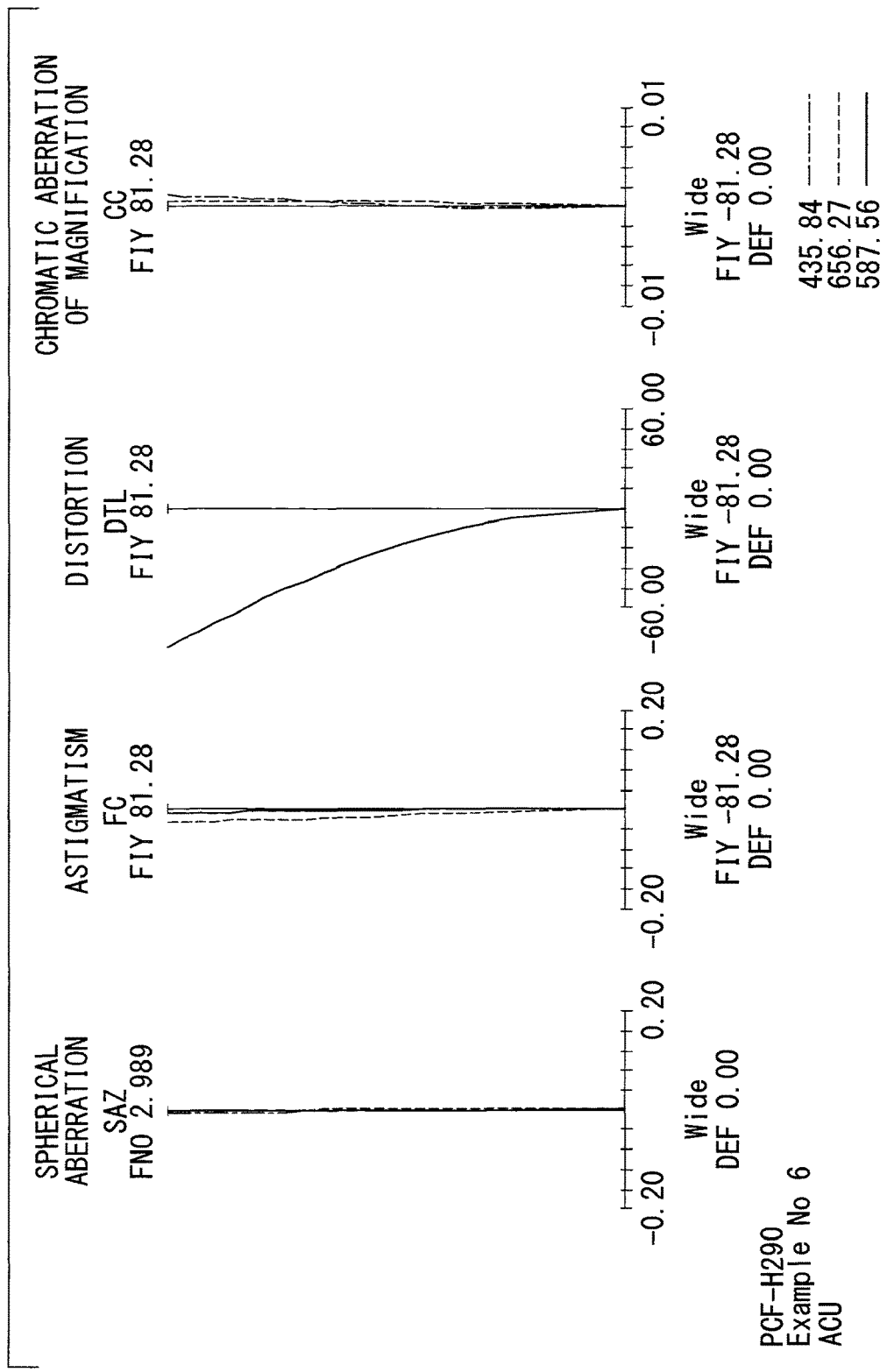

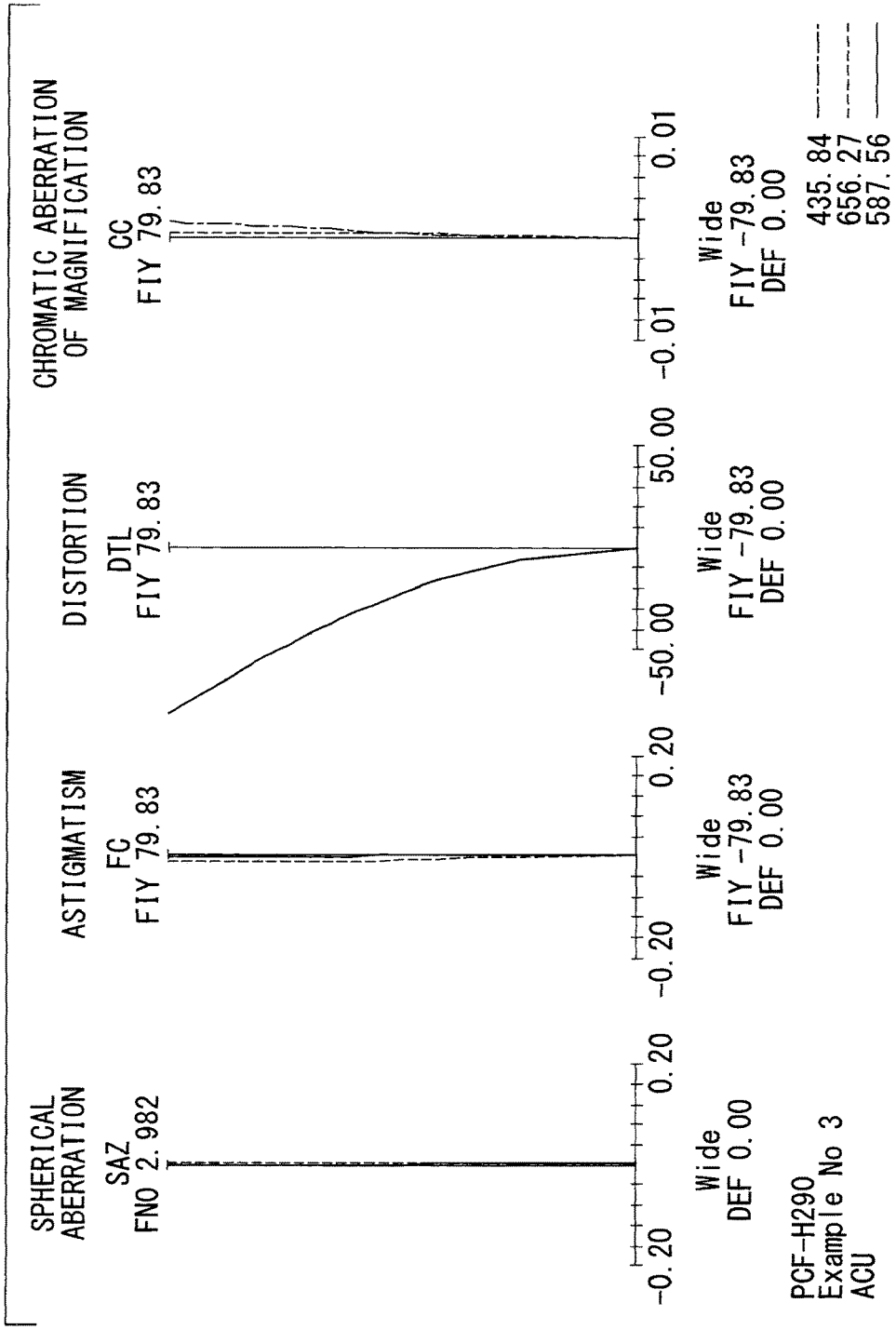

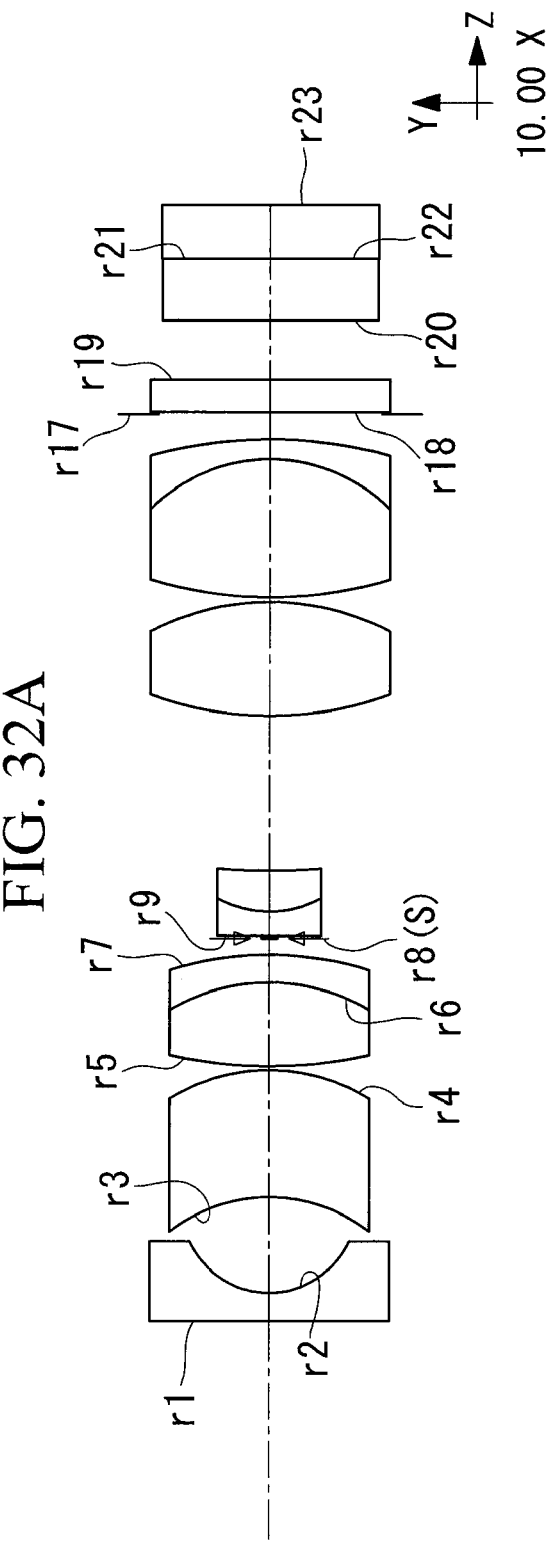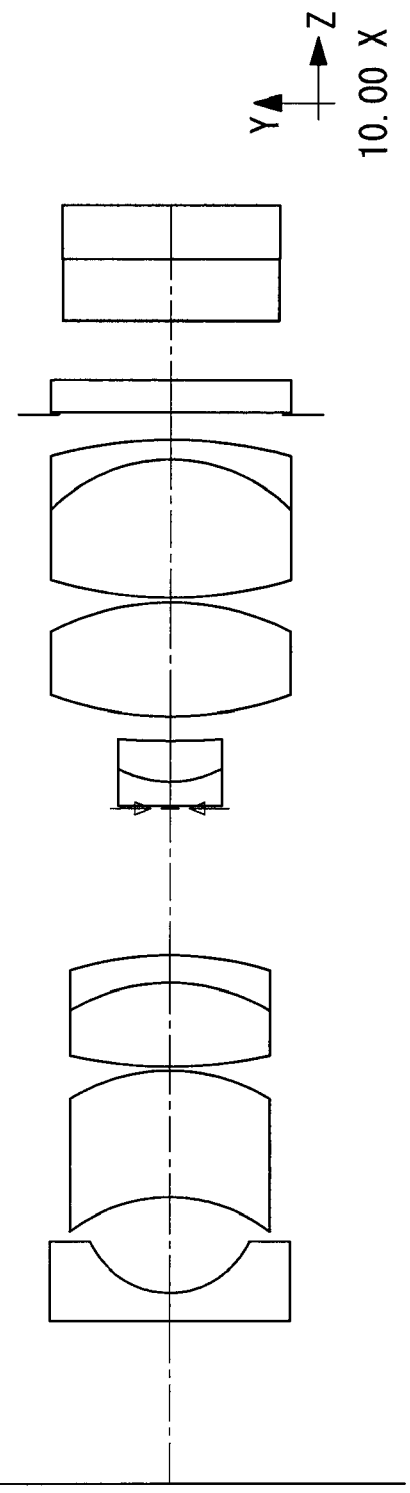
FIG. 32A
FIG. 32B

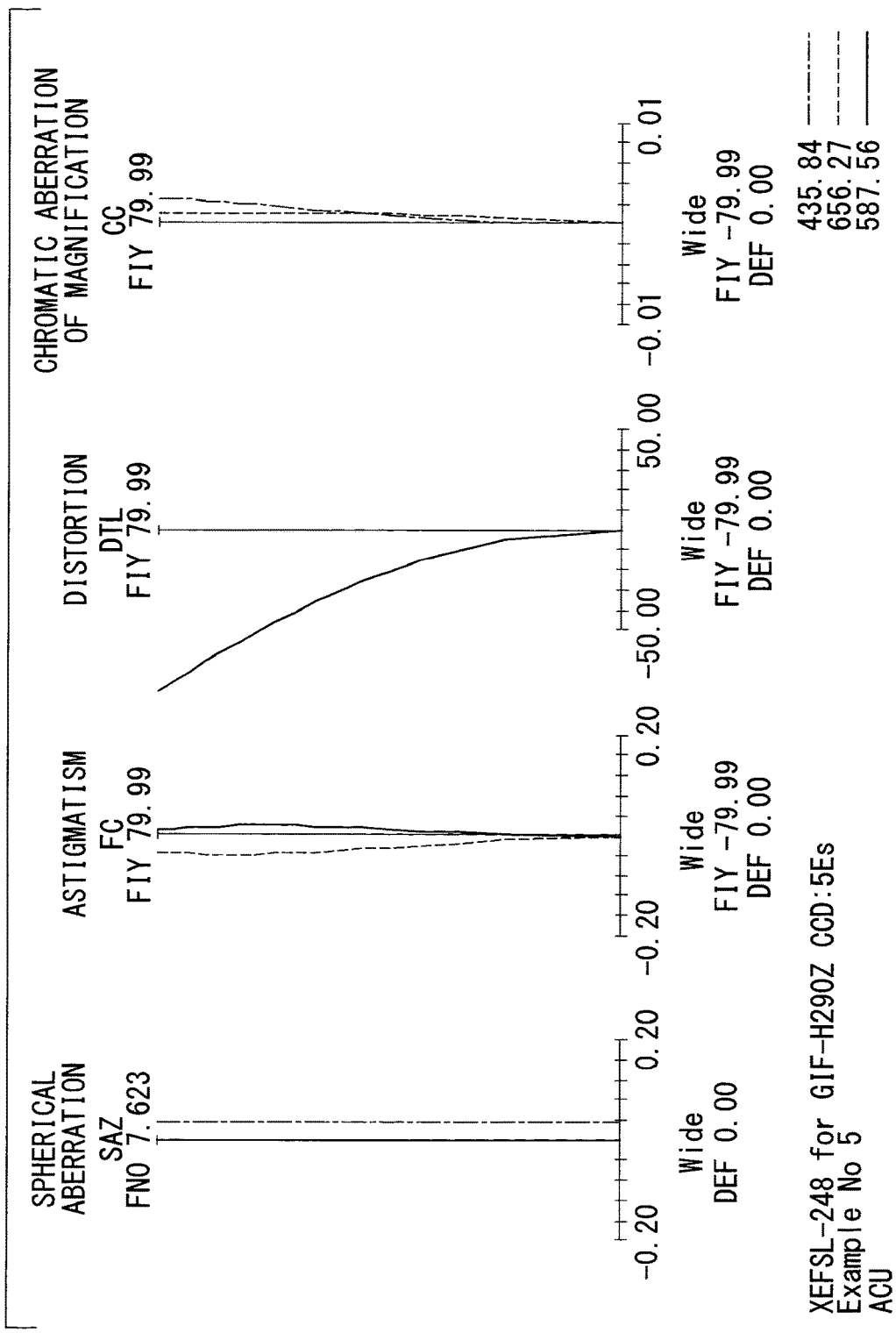

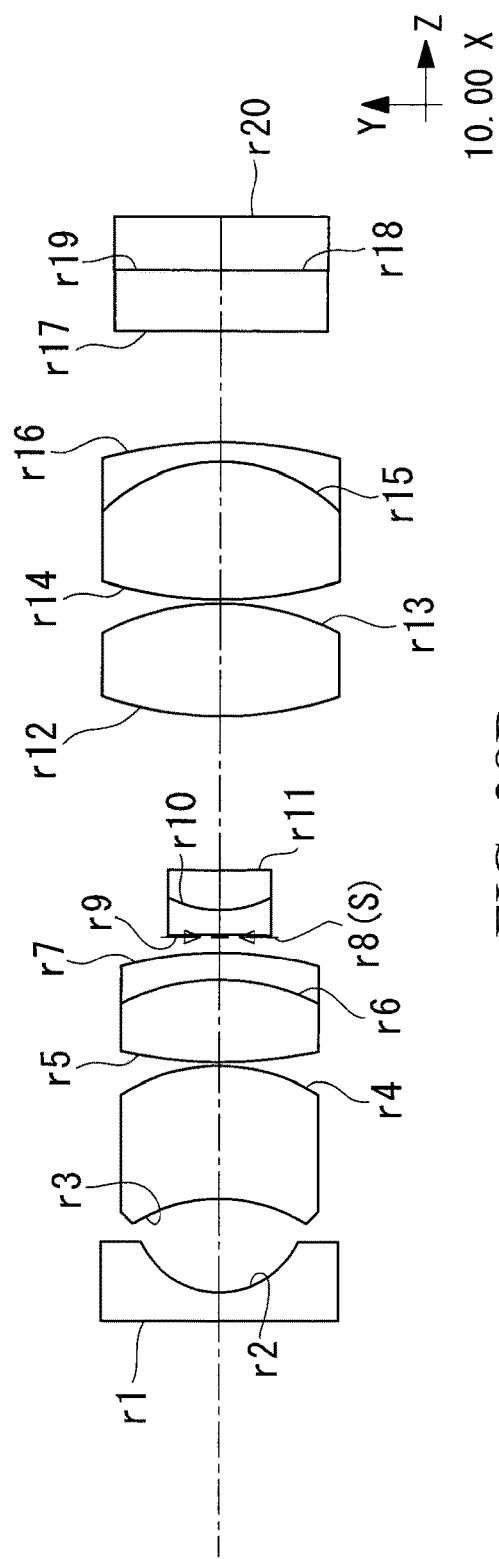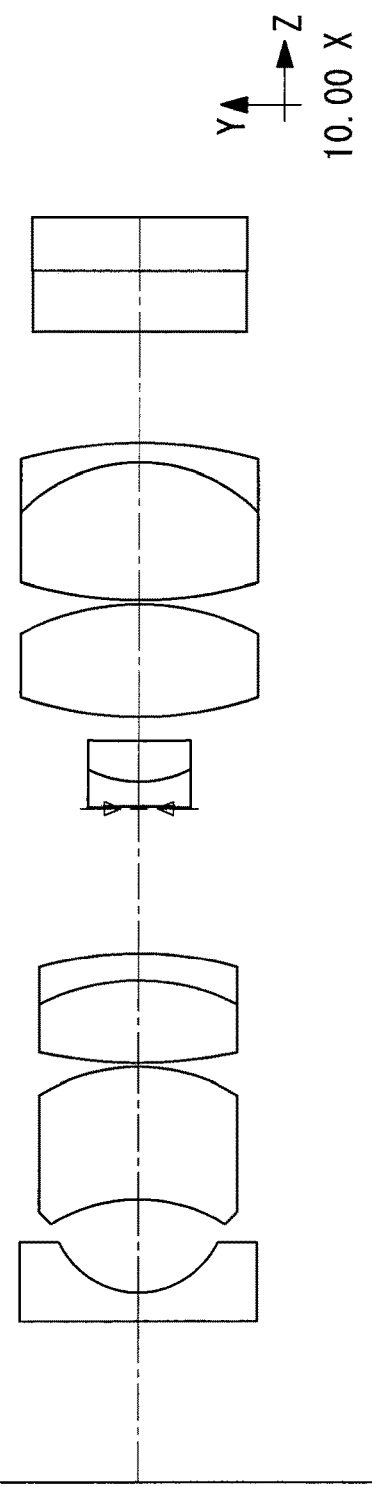
FIG. 38A
FIG. 38B

ENDOSCOPE OBJECTIVE OPTICAL SYSTEM

CROSS-REFERENCE TO RELATED APPLICATIONS

This application is a Continuation application of International Application No. PCT/JP2014/071652 filed on Aug. 19, 2014, which claims priority to Japanese Application No. 2013-172239 filed on Aug. 22, 2013.

The Contents of International Application No. PCT/JP2014/071652 and Japanese application No. 2013-172239 are hereby incorporated herein by reference in its entirety.

TECHNICAL FIELD

The present invention relates to an objective optical system and, more particularly, to an endoscope objective optical system to be applied to a medical endoscope.

BACKGROUND ART

As a medical endoscope, it is preferable to acquire an image of a high resolution and a wide angle of observation field, while ensuring low invasive to the patient. However, high image quality and less invasive are opposite to each other. Specifically, in order to obtain a high quality image, it is necessary to increase the number of pixels, and it is preferable to use a large imaging element. On the other hand, as the size of the imaging element increases, the imaging lens diameter becomes large, and as a result, the external diameter becomes larger, it makes it difficult to ensure the less invasiveness.

Therefore, in recent years, the pixel pitch is made smaller, the number of pixels is increased without increasing the size of the imaging element, a method for obtaining high quality images are becoming the mainstream. The pixel pitch has been becoming smaller and smaller as time goes and imaging elements having a pixel pitch of a few microns or less have also been developed.

For example, Patent Literature 1 and Patent Literature 2 disclose an objective optical system adapted to the miniaturized imaging element with the above-described pixel pitch which is several microns or less.

CITATION LIST

Patent Literature

{PTL 1} Japanese Unexamined Patent Application, Publication No. 2007-249189
{PTL 2} Japanese Unexamined Patent Application, Publication No. 2011-247949

SUMMARY OF INVENTION

One aspect of the present invention is an endoscope objective optical system including at least a first cemented lens which has a positive lens and a negative lens, in which the cemented lens satisfies the following conditional expressions, $$15.0 < \nu A - ndA < 15.75 \quad (1)$$

$$-0.2 > rdyA1/ih > -20 \quad (2)$$

wherein $\nu A$ is an Abbe number of the negative lens, $ndA$ is a refractive index of the negative lens at the d-line, $rdyA1$ is a curvature radius of a joining surface of the negative lens, and $ih$ is an image height.

BRIEF DESCRIPTION OF DRAWINGS

FIG. 6A depicts cross-sectional views of the overall structure of an objective optical system according to Example 2 of the present invention when the optical system is in a normal view state.

FIG. 6B depicts cross-sectional views of the overall structure of an objective optical system according to Example 2 of the present invention when the optical system is in a magnified view state.

FIG. 9A depicts cross-sectional views of the overall structure of an objective optical system according to Example 3 of the present invention when the optical system in a normal view state.

FIG. 9B depicts cross-sectional views of the overall structure of an objective optical system according to Example 3 of the present invention when the optical system is in a magnified view state.

FIG. 12A depicts cross-sectional views of the overall structure of an objective optical system according to Example 4 of the present invention when the optical system is in a normal view state.

FIG. 12B depicts cross-sectional views of the overall structure of an objective optical system according to Example 4 of the present invention when the optical system is in a magnified view state.

FIG. 18 shows graphs of aberrations of the objective optical system according to Example 6 of the present invention.

FIG. 31 shows graphs of aberrations of the objective optical system according to Example 12 of the present invention.

FIG. 32A depicts cross-sectional views of the overall structure of an objective optical system according to Example 13 of the present invention when the optical system is in a normal view state.

FIG. 32B depicts cross-sectional views of the overall structure of an objective optical system according to Example 13 of the present invention when the optical system is in a magnified view state.

FIG. 36 shows graphs of aberrations in the normal view state in the objective optical system according to Example 14 of the present invention.

FIG. 38A depicts cross-sectional views of the overall structure of an objective optical system according to Example 15 of the present invention when the optical system is in a normal view state.

FIG. 38B depicts cross-sectional views of the overall structure of an objective optical system according to Example 15 of the present invention when the optical system is in a magnified view state.

DESCRIPTION OF EMBODIMENTS

First Embodiment

An objective optical system according to a first embodiment of the present invention will be described below with reference to the drawings.

Figure 1:
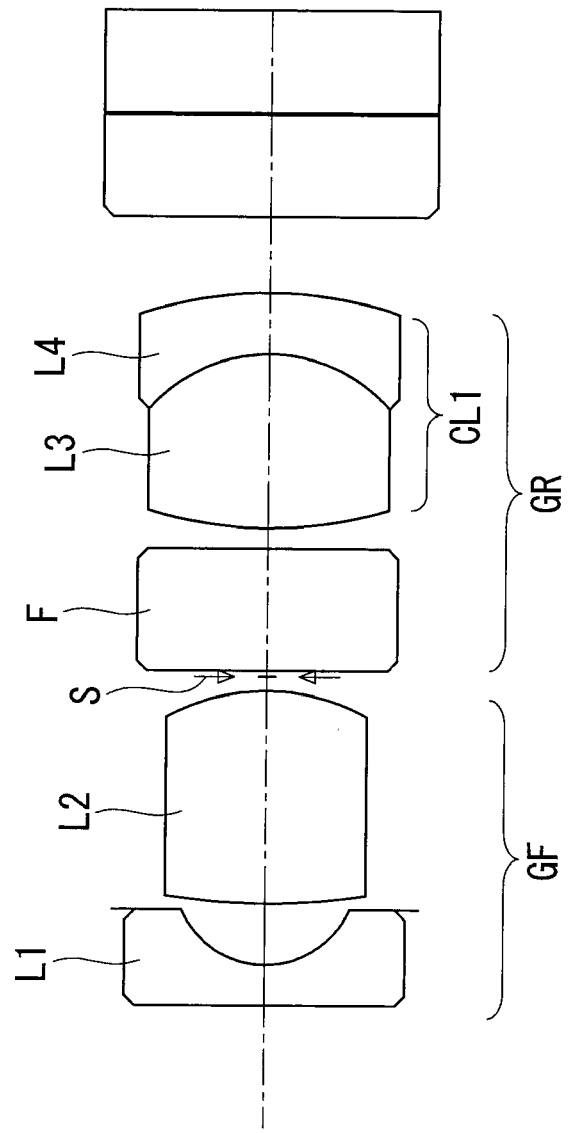
FIG. 1 is a cross-sectional view of the overall structure of an objective optical system according to a first embodiment of the present invention.

FIG. 1 is a cross-sectional view of the overall structure of the objective optical system. As shown in FIG. 1, the objective optical system includes a front lens group GF, an aperture stop S, and a rear lens group GR in this order from an object.

The front lens group GF includes a negative first lens L1 and a positive second lens L2 in this order from the object-side plane, and has positive refracting power. The rear lens group GR includes a parallel flat plate F and a cemented lens CL1 (first cemented lens) formed by joining a positive third lens L3 and a negative fourth lens L4, and has positive refracting power.

The cemented lens CL1 is formed so as to satisfy the following conditional expression (1) and conditional expression (2).

$$15.0 < vA - ndA < 15.75 \quad (1)$$

$$-0.2 > rdyA1/ih > -20 \quad (2)$$

In the expression, $vA$ is an Abbe number of the negative lens of the cemented lens CL1, $ndA$ is a refractive index of the negative lens at the d-line, $rdyA1$ is a curvature radius of the joining surface of the negative lens of the cemented lens CL1, and $ih$ is an image height.

When the upper limit of the conditional expression (1) is exceeded, the refractive index of the negative lens is too small to achieve necessary negative refracting power. In order to achieve negative refracting power, the curvatures of the joining surface and the air-contacting surface need to be increased, which undesirably causes, in particular, non-axial aberration. When the lower limit of the conditional expression (1) is exceeded, the Abbe number of the negative lens is too small, which leads to a state in which axial and non-axial chromatic aberration can be easily caused.

Furthermore, when the upper limit of the conditional expression (2) is exceeded, the curvature of the cemented lens becomes too small and hence the color correction effect of the cemented lens becomes lessened, which leads to a state in which axial and non-axial chromatic aberration can be easily caused. When the lower limit of the conditional expression (2) is exceeded, the curvature of the cemented lens becomes too large, which leads to a state in which axial and non-axial chromatic aberration can be easily caused.

Therefore, it is more preferable that the conditional expression (1)' and the conditional expression (2)' below or the conditional expression (1)" and the conditional expression (2)" below are adopted, as substitute for the conditional expression (1) and the conditional expression (2).

$$15.3 < vA-ndA < 15.7 \qquad (1)'$$

$$-1.0 > rdyA1/ih > -5.0 \qquad (2)'$$

$$15.5 < vA-ndA < 15.6 \qquad (1)''$$

$$-1.2 > rdyA1/ih > -2.5 \qquad (2)''$$

The negative fourth lens L4 of the cemented lens CL1 is formed so as to satisfy the following conditional expression (3).

$$-0.2 > (rdyA1+rdyA2)/(rdyA1-rdyA2) > -10 \qquad (3)$$

In the expression, rdyA2 is the curvature radius of the air-contacting surface of the negative lens of the cemented lens CL1.

The conditional expression (3) is a conditional expression regarding the shape factor of the negative fourth lens L4 of the cemented lens CL1. As a result of the negative fourth lens L4 of the cemented lens CL1 satisfying the conditional expression (3), axial and non-axial chromatic aberration can be corrected while still achieving necessary negative refracting power. When the upper limit of the conditional expression (3) is exceeded, the curvature radius of the joining surface becomes too small, which may make the processing difficult. In addition, because the curvature of the positive third lens L3 of the cemented lens CL1 also becomes large, it becomes difficult to secure a sufficient thickness of the positive third lens L3 at the periphery thereof. When the lower limit of the conditional expression (3) is exceeded, the curvature radius of the joining surface becomes too large, which makes it difficult to correct axial and non-axial chromatic aberration.

For this reasons above, it is more preferable that the conditional expression (3)' or the conditional expression (3)" below are adopted, as substitute for the conditional expression (3).

$$-0.3 > (rdyA1+rdyA2)/(rdyA1-rdyA2) > -3.0 \qquad (3)'$$

The following conditional expression is still more preferable.

$$-0.4 > (rdyA1+rdyA2)/(rdyA1-rdyA2) > -2.5 \qquad (3)''$$

It is preferable that in the objective optical system according to this embodiment, the negative lens is disposed most closely to the object-side plane, like the first lens L1 of the front lens group GF in FIG. 1, and the negative lens disposed most closely to the object-side plane is configured so as to satisfy the following conditional expression (4).

$$-3.0 \leq rdy12/rdyA1 < -0.2 \qquad (4)$$

In the expression, rdy12 is the image-side curvature radius of the negative first lens.

The conditional expression (4) is a conditional expression for the image-side curvature radius of the negative first lens L1 and the curvature radius of the cemented lens CL1. By satisfying the conditional expression (4), it is possible to favorably maintain the balance between the image-side curvature radius of the negative first lens L1 and the curvature radius of the cemented lens CL1, making it possible to favorably correct comatic aberration, field curvature, axial chromatic aberration, and chromatic aberration of magnification. However, when the upper limit of the conditional expression (4) is exceeded, the curvature radius of the negative first lens L1 becomes large, which may worsen comatic aberration, field curvature, and distortion. Furthermore, when the lower limit of the conditional expression (4) is exceeded, the curvature radius of the cemented lens CL1 becomes too large, which makes it difficult to correct axial chromatic aberration and chromatic aberration of magnification.

Therefore, it is more preferable that the conditional expression (4)' or the conditional expression (4)" below are adopted, as substitute for the conditional expression (4).

$$-2.5 \leq rdy12/rdyA1 < -0.3 \qquad (4)'$$

$$-2.0 \leq rdy12/rdyA1 < -0.39 \qquad (4)''$$

Furthermore, the cemented lens CL1 is configured to satisfy the following conditional expression (5).

$$1.0 < DB/DA < 10 \qquad (5)$$

$$0.1 < DA/ih < 2.0 \qquad (6)$$

In the expression, DA is the thickness at the middle of the negative fourth lens L4 of the cemented lens CL1, and DB is the thickness at the middle of the positive third lens L3 of the cemented lens CL1.

The conditional expression (5) and the conditional expression (6) are conditional expressions regarding the thickness at the middle of the cemented lens CL1. By satisfying the conditional expression (5) and the conditional expression (6), it becomes possible to achieve an objective optical system with an appropriate overall length in which the lenses do not easily exhibit manufacturing defects, such as fracture and cracks.

When the upper limit of the conditional expression (5) is exceeded, the thickness at the middle of the negative fourth lens L4 of the cemented lens CL1 becomes too small, which may easily cause fracture or cracks. When the lower limit of the conditional expression (5) is exceeded, the thickness at the middle of the positive third lens L3 of the cemented lens becomes too small, which makes it difficult to secure a sufficient thickness at the periphery thereof and hence drastically degrades the ease of processing.

When the upper limit of the conditional expression (6) is exceeded, the thickness at the middle of the negative fourth lens L4 becomes too large, causing the overall length to be undesirably large. When the lower limit of the conditional expression (6) is exceeded, the thickness at the middle of the negative fourth lens L4 becomes too small, which may cause fracture or cracks.

Therefore, it is more preferable that the conditional expression (5)' and the conditional expression (6)' below or the conditional expression (5)" and the conditional expression (6)" below are adopted, as substitute for the conditional expression (5) and the conditional expression (6).

$$2.5 < DB/DA < 7.5 \qquad (5)'$$

$$0.15 < DA/ih < 1.0 \qquad (6)'$$

The following conditional expression is still more preferable.

$$4.0<DB/DA<4.5 \quad (5)''$$

$$0.2<DA/ih<0.7 \quad (6)''$$

Furthermore, the negative first lens L1 disposed most closely to the object-side plane and the negative lens of the cemented lens CL1 are configured to satisfy the following conditional expression.

$$0.5<PW1/PW4<10 \quad (7)$$

In the expression, PW1 is the refracting power of the negative first lens, and PW4 is the refracting power of the negative lens of the cemented lens.

The conditional expression (7) is a conditional expression for the refracting power of the negative first lens L1 and the refracting power of the negative fourth lens L4 of the cemented lens CL1. By satisfying the conditional expression (7), it is possible to favorably maintain the balance between the refracting power of the negative first lens L1 and the refracting power of the negative third lens L3 in the cemented lens CL1, making it possible to favorably correct comatic aberration, field curvature, axial chromatic aberration, and chromatic aberration of magnification. When the upper limit of the conditional expression (7) is exceeded, the refracting power of the negative first lens L1 becomes too intense, worsening comatic aberration, field curvature, and distortion. When the lower limit of the conditional expression (7) is exceeded, the refracting power of the negative fourth lens L4 of the cemented lens CL1 becomes too intense, making it difficult to correct axial chromatic aberration and chromatic aberration of magnification.

Therefore, it is more preferable that the conditional expression (7)' or the conditional expression (7)" below are adopted, as substitute for the conditional expression (7).

$$1.5<PW1/PW4<5.0 \quad (7)'$$

$$1.58<PW1/PW4<3.0 \quad (7)''$$

The negative first lens disposed most closely to the object-side plane is configured to satisfy the following conditional expression (8).

$$0.5<(rdy11+rdy12)/(rdy11-rdy12)<1.7 \quad (8)$$

In the expression, rdy11 is the object-side curvature radius of the negative first lens, and rdy12 is the image-side curvature radius of the negative first lens.

The conditional expression (8) is a conditional expression regarding the shape factor of the negative first lens L1. By satisfying the conditional expression (8), the necessary negative refracting power can be achieved. When the lower limit of the conditional expression (8) is exceeded, the refracting power of the negative first lens L1 decreases. When the upper limit of the conditional expression (8) is exceeded, the lens productivity drastically decreases.

Therefore, it is more preferable that the conditional expression (8)' or the conditional expression (8)" below is adopted, as substitute for the conditional expression (8).

$$0.7<(rdy11+rdy12)/(rdy11-rdy12)<1.3 \quad (8)'$$

The following conditional expression is still more preferable.

$$0.99<(rdy11+rdy12)/(rdy11-rdy12)<1.01 \quad (8)''$$

The cemented lens CL1 is configured to satisfy the following conditional expression (9).

$$0.05<(rdyB1+rdyB2)/(rdyB1-rdyB2)<2.0 \quad (9)$$

In the expression, rdyB1 is the curvature radius of the air-contacting surface of the positive third lens L3 in the cemented lens CL1, and rdyB2 is the curvature radius of the joining surface of the positive third lens L3 in the cemented lens CL1.

The conditional expression (9) is a conditional expression regarding the shape factor of the positive third lens L3 of the cemented lens CL1. By satisfying the conditional expression (9), an appropriate curvature radius can be obtained, making it possible to secure a sufficient thickness at the periphery of the lens while still ensuring the necessary positive refracting power. When the upper limit or the lower limit of the conditional expression (9) is exceeded, either one of the curvature radii becomes too small and a sufficient thickness at the periphery thereof cannot be ensured, making manufacturing thereof considerably difficult.

Therefore, it is more preferable that the conditional expression (9)' or the conditional expression (9)" below is adopted, as substitute for the conditional expression (9).

$$0.1<(rdyB1+rdyB2)/(rdyB1-rdyB2)<0.5 \quad (9)'$$

$$0.13<(rdyB1+rdyB2)/(rdyB1-rdyB2)<0.45 \quad (9)''$$

As described above, according to this embodiment, it is possible to make the objective optical system capable of acquiring an image having high precision and a wide angle of observation field by satisfactorily correcting various aberrations while ensuring low invasiveness.

Although the above-described embodiment has been described by way of an example where the rear lens group GR is configured to include the one cemented lens CL1, the rear lens group GR may be provided with a plurality of cemented lenses. In addition, both of the front lens group GF and the rear lens group GR may be configured to include the cemented lens.

Second Embodiment

An objective optical system according to a second embodiment of the present invention will be described below with reference to the drawings.

Figure 2:
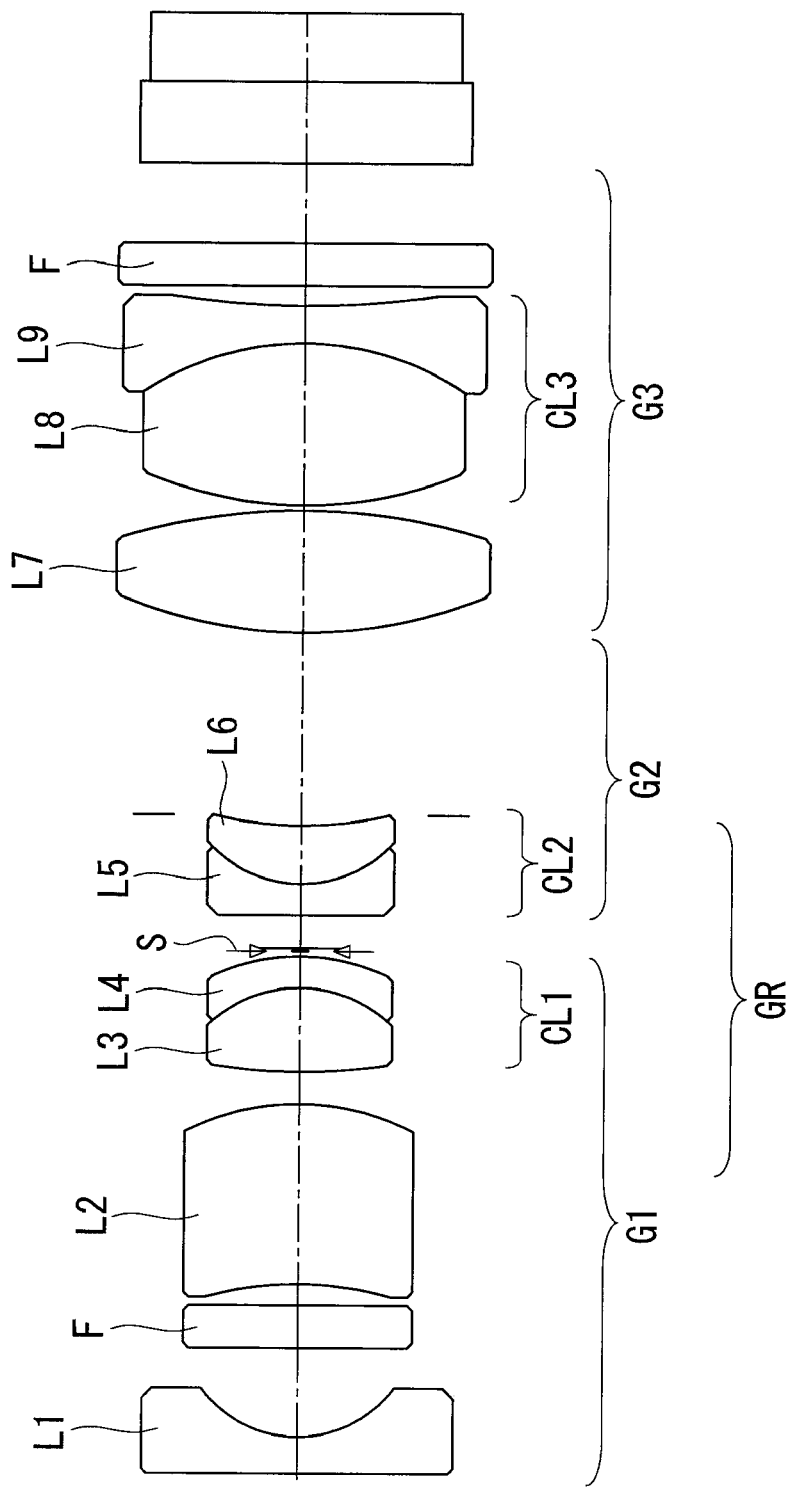
FIG. 2 is a cross-sectional view of the overall structure of an objective optical system according to a second embodiment of the present invention.

FIG. 2 is a cross-sectional view of the overall structure of the objective optical system. As shown in FIG. 2, the objective optical system includes a first lens group G1, an aperture stop S, a second lens group, and a third lens group G3 in this order from an object.

The first lens group G1 includes the negative first lens L1, the parallel flat plate F, the positive second lens L2, and the first cemented lens CL1 formed by joining the positive third lens L3 and the negative fourth lens L4 in this order from the object, and has positive refracting power.

The second lens group G2 includes a cemented lens CL2 formed by joining a negative fifth lens L5 and a positive sixth lens L6, and has negative refracting power. Furthermore, the second lens group G2 is movable along the optical axis, and it is possible to switch between a normal view and a magnified view by moving the second lens group G2.

The third lens group G3 includes a positive seventh lens L7, a cemented lens CL3 formed by joining a positive eighth lens L8 and a negative ninth lens L9, and the parallel flat plate F, and has positive refracting power.

The objective optical system according to this embodiment is also configured to satisfy the conditional expressions (1) through (9) in the above-described first embodiment. In this case, it is sufficient if at least one of the cemented lens CL1 and the cemented lens CL2 is configured to satisfy each conditional expression.

Furthermore, the objective optical system according to this embodiment is configured to satisfy the following conditional expression (10).

$$1 < FL2G \times \Delta 2G/FL^2 < 200 \quad (10)$$

In the expression, Δ2G is the absolute value of the displacement of the second lens group from a normal view to a close-up magnified view, FL is a focal length of the entire objective optical system in a normal view, and FL2G is a focal length of the second lens group.

The conditional expression (10) is a conditional expression regarding the displacement of the second lens group G2 from the normal view to the close-up magnified view. By satisfying the conditional expression (10), an appropriate displacement can be performed and a focus range in accordance with a technician's intuition can be realized. When the upper limit of the conditional expression (10) is exceeded, the displacement is too large, causing the overall length to become undesirably large. When the lower limit of the conditional expression (10) is exceeded, the focus changes with a small displacement, degrading the usability of the system by a technician.

Because of this, it is more preferable that the conditional expression (10)' or the conditional expression (10)" below are adopted, as substitute for the conditional expression (10).

$$3 < FL2G \times \Delta 2G/FL^2 < 10 \quad (10)'$$

$$4.4 < FL2G \times \Delta 2G/FL^2 < 6.0 \quad (10)''$$

Third Embodiment

An objective optical system according to a third embodiment of the present invention will be described below with reference to the drawings.

Figure 3:
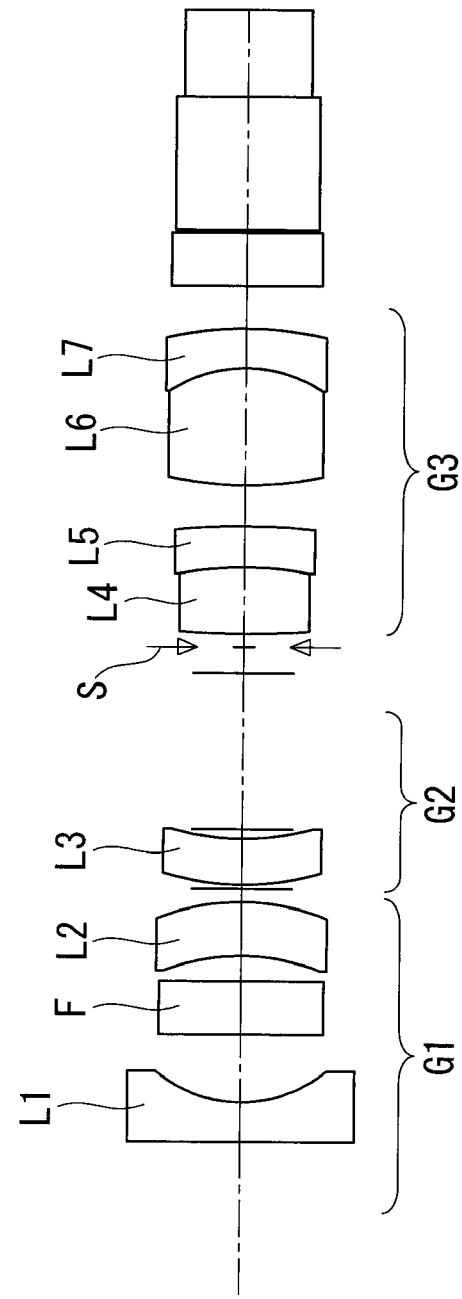
FIG. 3 is a cross-sectional view of the overall structure of an objective optical system according to a third embodiment of the present invention.

FIG. 3 is a cross-sectional view of the overall structure of the objective optical system. As shown in FIG. 3, the objective optical system includes a first lens group G1, a second lens group, an aperture stop S, and a third lens group G3 in this order from an object.

The first lens group G1 includes the negative first lens L1, the parallel flat plate F, and the positive second lens L2 in this order from the object, and has positive refracting power.

The second lens group G2 includes the positive third lens L3 movable at the time of focusing so that it is possible to switch between a normal view and a magnified view by moving the second lens group G2.

The third lens group G3 includes the cemented lens CL1 formed by joining the positive fourth lens L4 and the negative fifth lens L5, the cemented lens CL2 formed by joining the positive sixth lens L6 and the negative seventh lens L7, and the parallel flat plate F, and has positive refracting power.

The objective optical system according to this embodiment is also configured to satisfy the conditional expressions (1) through (9) in the above-described first embodiment. In this case, it is sufficient if at least one of the cemented lens CL1 and the cemented lens CL2 is configured to satisfy each conditional expression.

EXAMPLES

Next, Examples 1 to 15 of the objective optical system according to any one of the embodiments described above will be described with reference to FIGS. 4 to 33. In the lens data described in each of the examples, r is the radius of curvature (mm), d is the axial distance (mm), Nd represents a refractive index at the d-line, and Vd represents the Abbe number at the d-line.

Example 1

Figure 4:
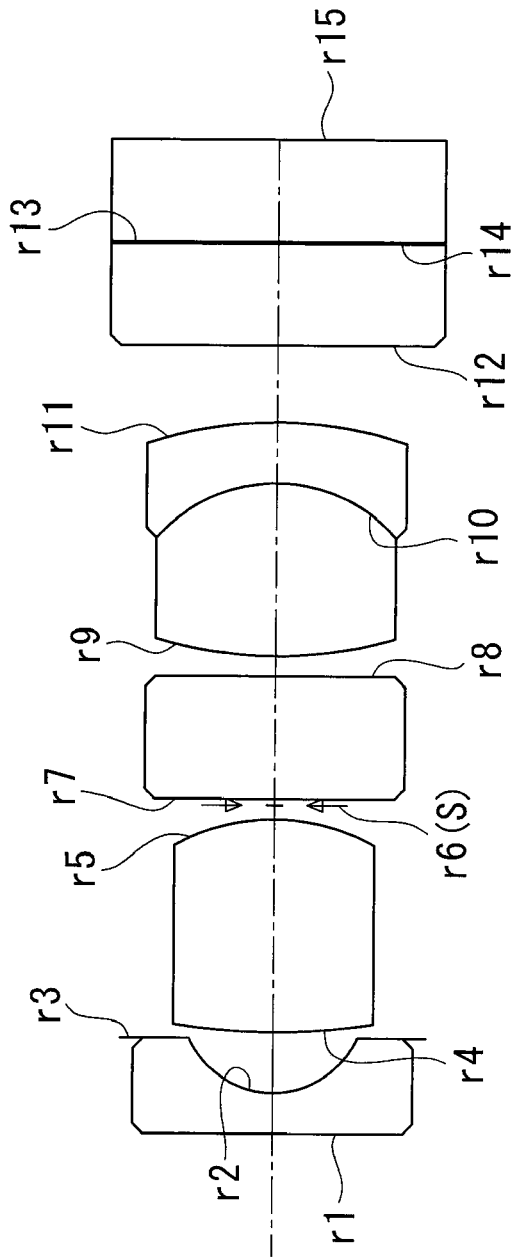
FIG. 4 is a cross-sectional view of the overall structure of an objective optical system according to Example 1 of the present invention.
Figure 5:
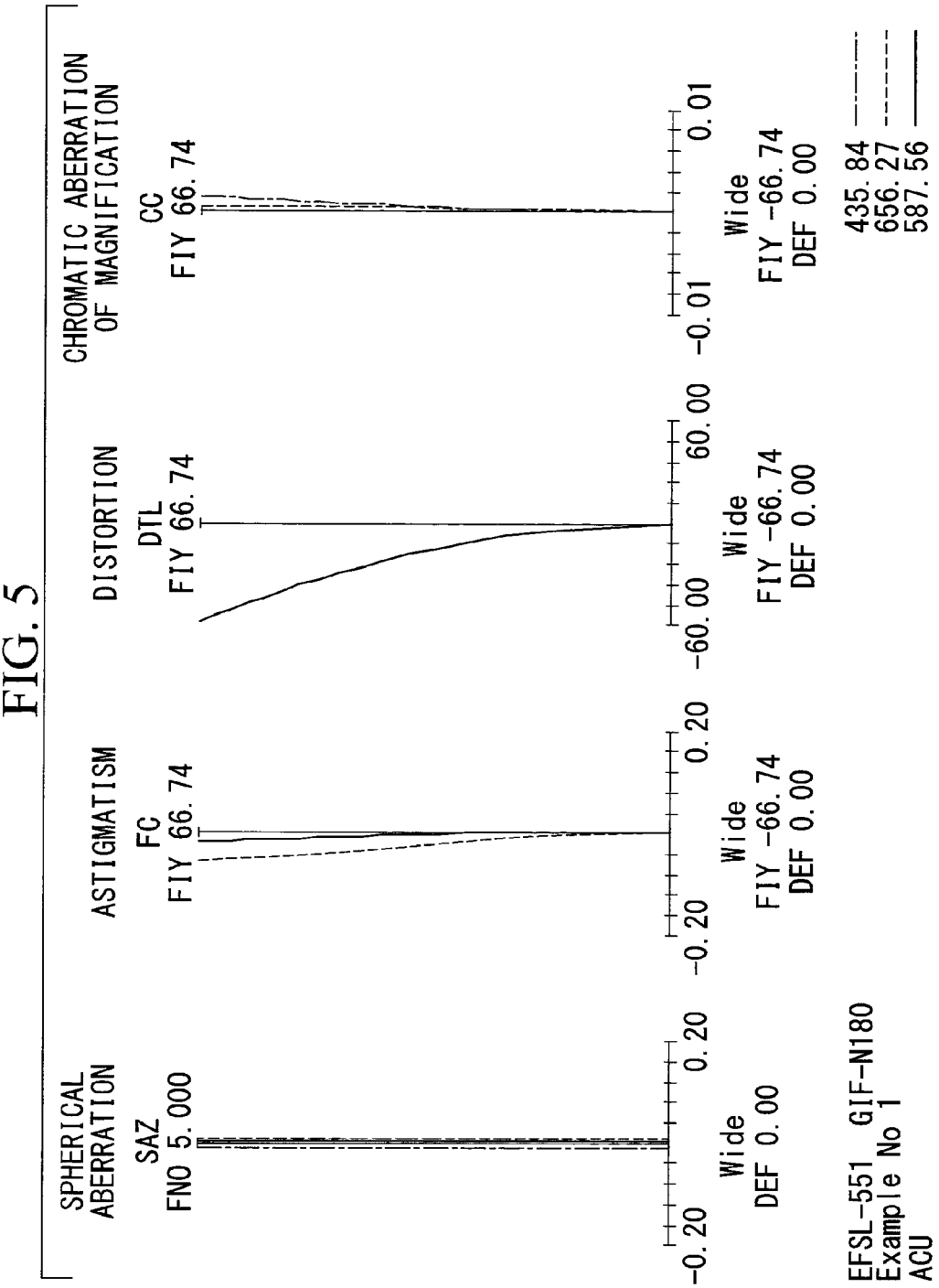
FIG. 5 shows graphs of aberrations of the objective optical system according to Example 1 of the present invention.

FIG. 4 shows a cross-sectional view of the overall configuration of an objective optical system according to Example 1 of the present invention, FIG. 5 shows aberration charts, and lens data of the objective optical system according Example 1 is shown below.

| Lens data | | | | |
|---|---|---|---|---|
| Surface Number | r | d | Nd | Vd |
| 1 | ∞ | 0.20 | 1.88300 | 40.76 |
| 2 | 0.462 | 0.27 | | |
| 3 | ∞ | 0.03 | | |
| 4 | 3.254 | 1.05 | 1.83400 | 37.16 |
| 5 | −1.041 | 0.07 | | |
| 6 | aperture stop | 0.03 | | |
| 7 | ∞ | 0.60 | 1.52100 | 65.12 |
| 8 | ∞ | 0.10 | | |
| 9 | 2.124 | 0.85 | 1.75500 | 52.32 |
| 10 | −0.804 | 0.30 | 1.95906 | 17.47 |
| 11 | −2.068 | 0.38 | | |
| 12 | ∞ | 0.50 | 1.51633 | 64.14 |
| 13 | ∞ | 0.01 | 1.00000 | 64.00 |
| 14 | ∞ | 0.50 | 1.00000 | 50.49 |
| 15 | ∞ | | | |

| Various data | |
|---|---|
| Focal length | 0.67 |
| FNO. | 5.00 |
| Angle of observation field 2ω | 133.48 |

| Focal length of each group | |
|---|---|
| Front group | Rear group |
| 2.25 | 1.93 |

Example 2

Figure 7:
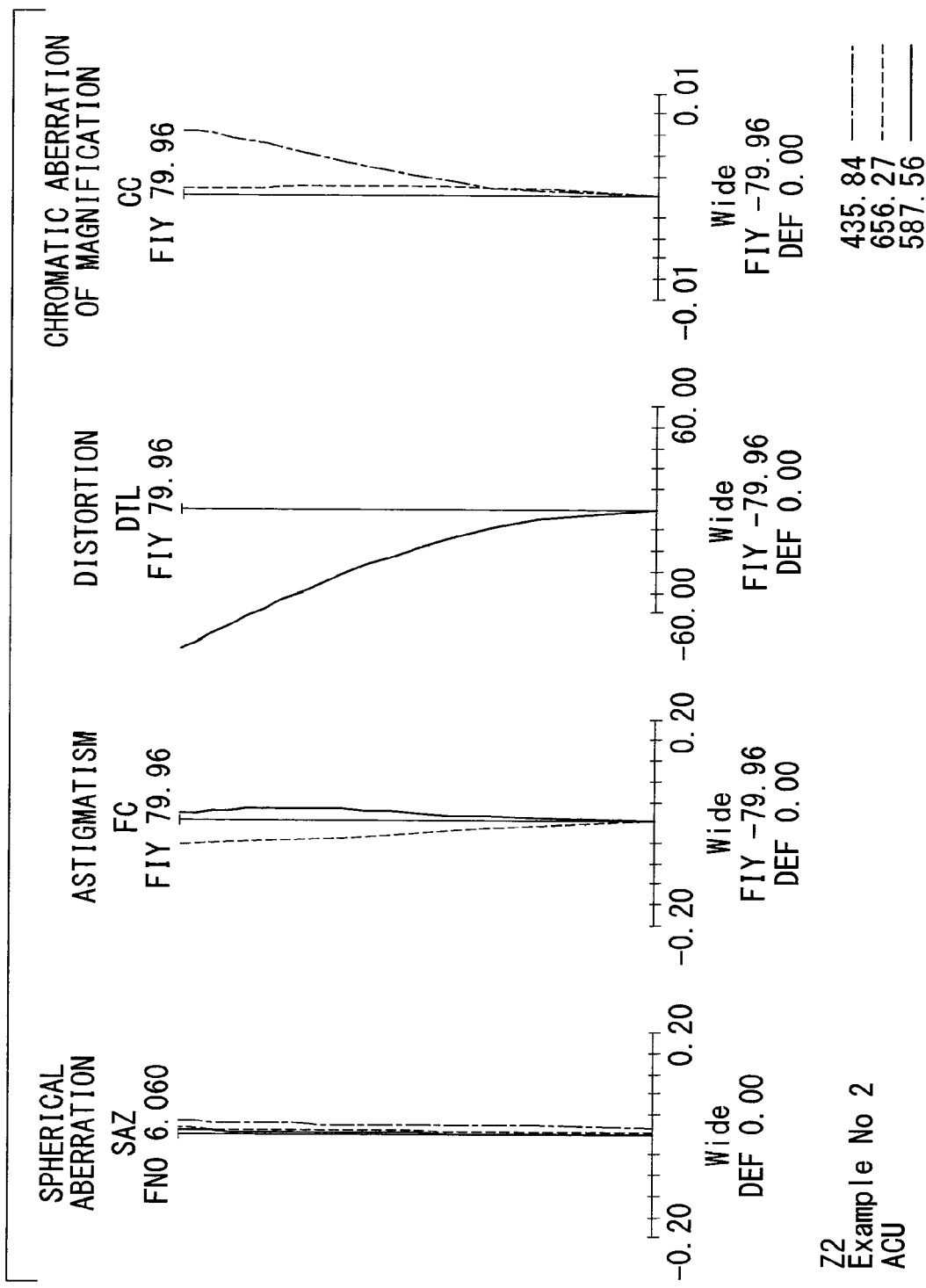
FIG. 7 shows graphs of aberrations in the normal view state in the objective optical system according to Example 2 of the present invention.
Figure 8:
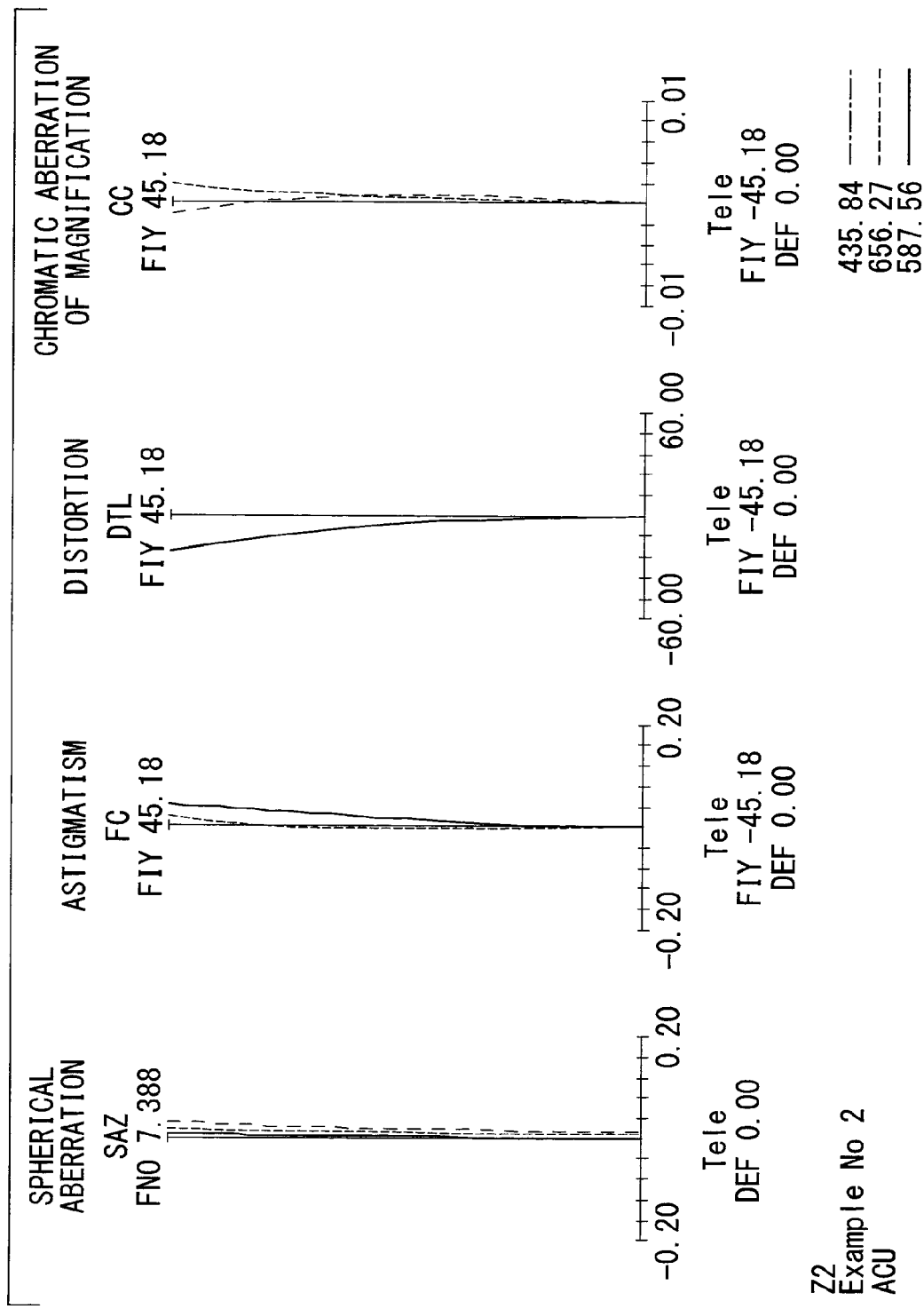
FIG. 8 shows graphs of aberrations in the magnified view state in the objective optical system according to Example 2 of the present invention.

FIG. 6 shows a cross-sectional view of the overall configuration of an objective optical system according to Example 2 of the present invention, FIGS. 7 and 8 show aberration charts, and lens data of the objective optical system according Example 2 is shown below.

| Lens data | | | | |
|---|---|---|---|---|
| Surface Number | r | d | Nd | Vd |
| 1 | ∞ | 0.35 | 1.88300 | 40.76 |
| 2 | 1.158 | 0.85 | | |
| 3 | ∞ | 0.40 | 1.52100 | 65.12 |
| 4 | ∞ | 0.20 | | |
| 5 | −3.355 | 1.70 | 1.58144 | 40.75 |
| 6 | −2.430 | 0.30 | | |
| 7 | 5.659 | 0.80 | 1.51742 | 52.43 |
| 8 | −1.284 | 0.30 | 1.92286 | 18.90 |
| 9 | −2.002 | 0.05 | | |
| 10 | aperture stop | 0.03 | | |
| 11 | ∞ | D11 | | |
| 12 | ∞ | 0.30 | 1.77250 | 49.60 |
| 13 | 1.216 | 0.55 | 1.72825 | 28.46 |
| 14 | 3.618 | 0.10 | | |

-continued

| | | | | |
|---|---|---|---|---|
| 15 | ∞ | D15 | | |
| 16 | 4.765 | 1.15 | 1.81600 | 46.62 |
| 17 | −6.127 | 0.05 | | |
| 18 | 3.997 | 1.53 | 1.61800 | 63.33 |
| 19 | −2.843 | 0.35 | 1.95906 | 17.47 |
| 20 | 8.733 | 0.09 | | |
| 21 | ∞ | 0.10 | | |
| 22 | ∞ | 0.40 | 1.52300 | 58.59 |
| 23 | ∞ | 0.75 | | |
| 24 | ∞ | 0.75 | 1.51633 | 64.14 |
| 25 | ∞ | 0.01 | 1.51300 | 64.01 |
| 26 | ∞ | 0.65 | 1.50510 | 63.26 |
| 27 | ∞ | | | |

Zoom data

| | Normal View state | Magnified view state |
|---|---|---|
| Focal length | 1.15 | 1.40 |
| FNO. | 6.06 | 7.39 |
| Angle of observation field 2ω | 159.91 | 90.36 |

Various data

| | | |
|---|---|---|
| D11 | 0.31 | 1.71 |
| D15 | 1.72 | 0.32 |

Focal length of each group

| First group | Second group | Third group |
|---|---|---|
| 1.94 | −4.17 | 3.09 |

Example 3

Figure 10:
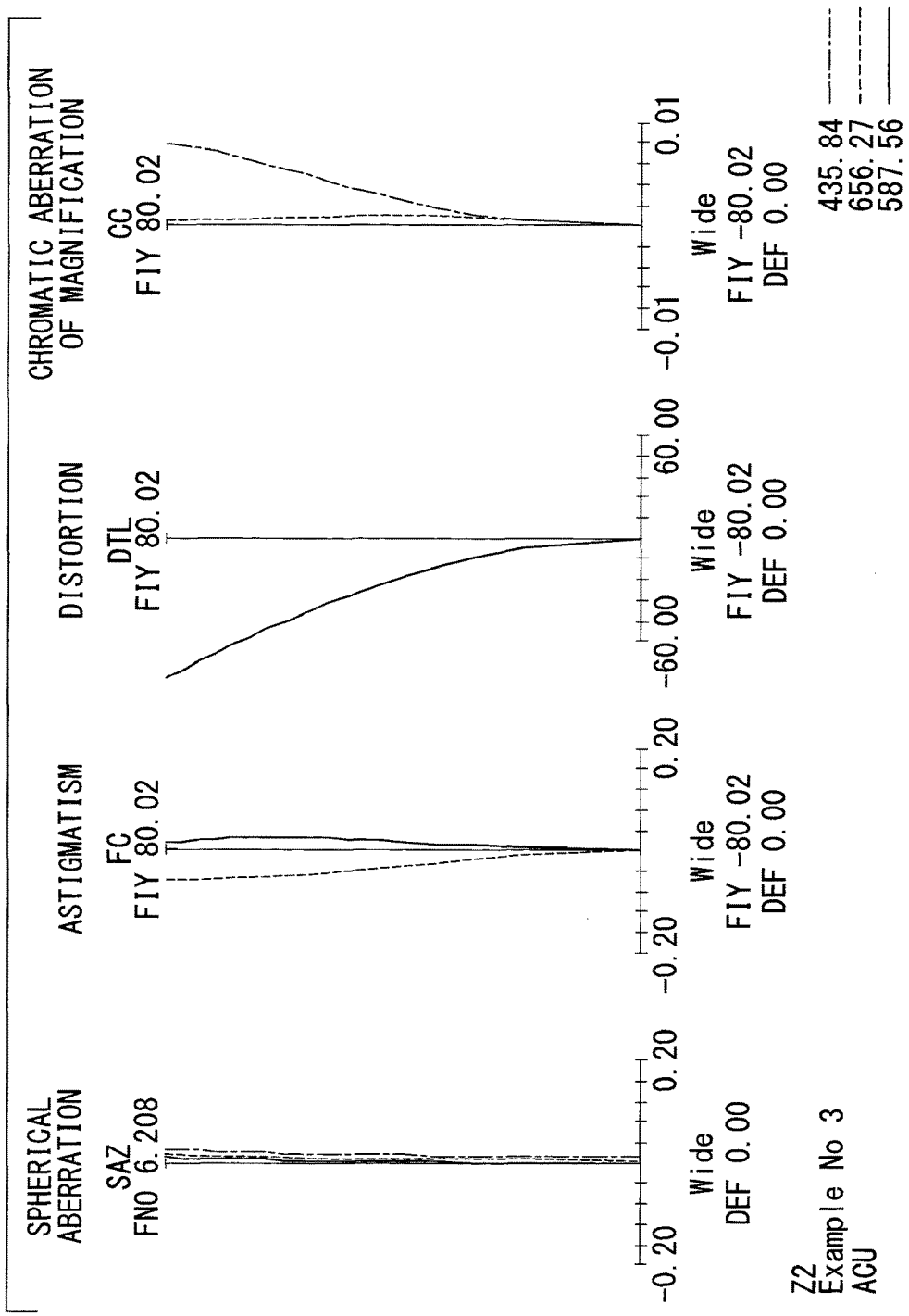
FIG. 10 shows graphs of aberrations in the normal view state in the objective optical system according to Example 3 of the present invention.
Figure 11:
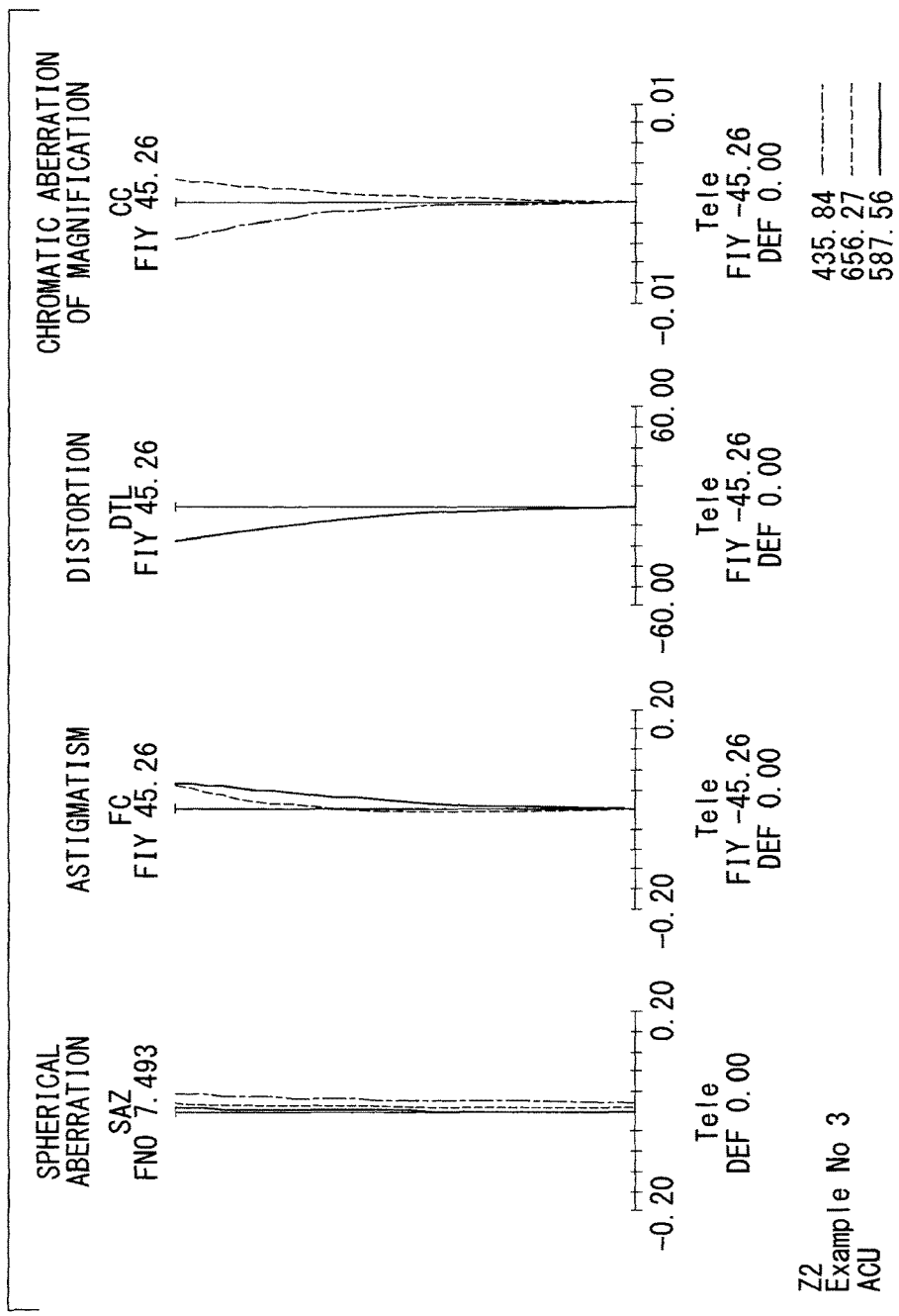
FIG. 11 shows graphs of aberrations in the magnified view state in the objective optical system according to Example 3 of the present invention.

FIG. 9 shows a cross-sectional view of the overall configuration of an objective optical system according to Example 3 of the present invention, FIGS. 10 and 11 show aberration charts, and lens data of the objective optical system according Example 3 is shown below.

Lens data

| Surface Number | r | d | Nd | Vd |
|---|---|---|---|---|
| 1 | ∞ | 0.35 | 1.88300 | 40.76 |
| 2 | 1.148 | 0.85 | | |
| 3 | ∞ | 0.40 | 1.52100 | 65.12 |
| 4 | ∞ | 0.20 | | |
| 5 | −3.309 | 1.70 | 1.58144 | 40.75 |
| 6 | −2.474 | 0.30 | | |
| 7 | 6.028 | 0.80 | 1.51742 | 52.43 |
| 8 | −1.255 | 0.30 | 1.95906 | 17.47 |
| 9 | −1.910 | 0.05 | | |
| 10 | aperture stop | 0.03 | | |
| 11 | ∞ | D11 | | |
| 12 | ∞ | 0.30 | 1.77250 | 49.60 |
| 13 | 1.089 | 0.55 | 1.72825 | 28.46 |
| 14 | 3.739 | 0.10 | | |
| 15 | ∞ | D15 | | |
| 16 | 4.574 | 1.15 | 1.81600 | 46.62 |
| 17 | −6.626 | 0.05 | | |
| 18 | 3.758 | 1.53 | 1.61800 | 63.33 |
| 19 | −2.858 | 0.35 | 1.95906 | 17.47 |
| 20 | 6.853 | 0.09 | | |
| 21 | ∞ | 0.10 | | |
| 22 | ∞ | 0.40 | 1.52300 | 58.59 |
| 23 | ∞ | 0.76 | | |
| 24 | ∞ | 0.75 | 1.51633 | 64.14 |
| 25 | ∞ | 0.01 | 1.51300 | 64.01 |
| 26 | ∞ | 0.65 | 1.50510 | 63.26 |
| 27 | ∞ | | | |

Zoom data

| | Normal View state | Magnified view state |
|---|---|---|
| Focal length | 1.15 | 1.40 |
| FNO. | 6.21 | 7.49 |
| Angle of observation field 2ω | 160.04 | 90.53 |

Various data

| | | |
|---|---|---|
| D11 | 0.31 | 1.71 |
| D15 | 1.72 | 0.32 |

Focal length of each group

| First group | Second group | Third group |
|---|---|---|
| 1.91 | −4.20 | 3.12 |

Example 4

Figure 13:
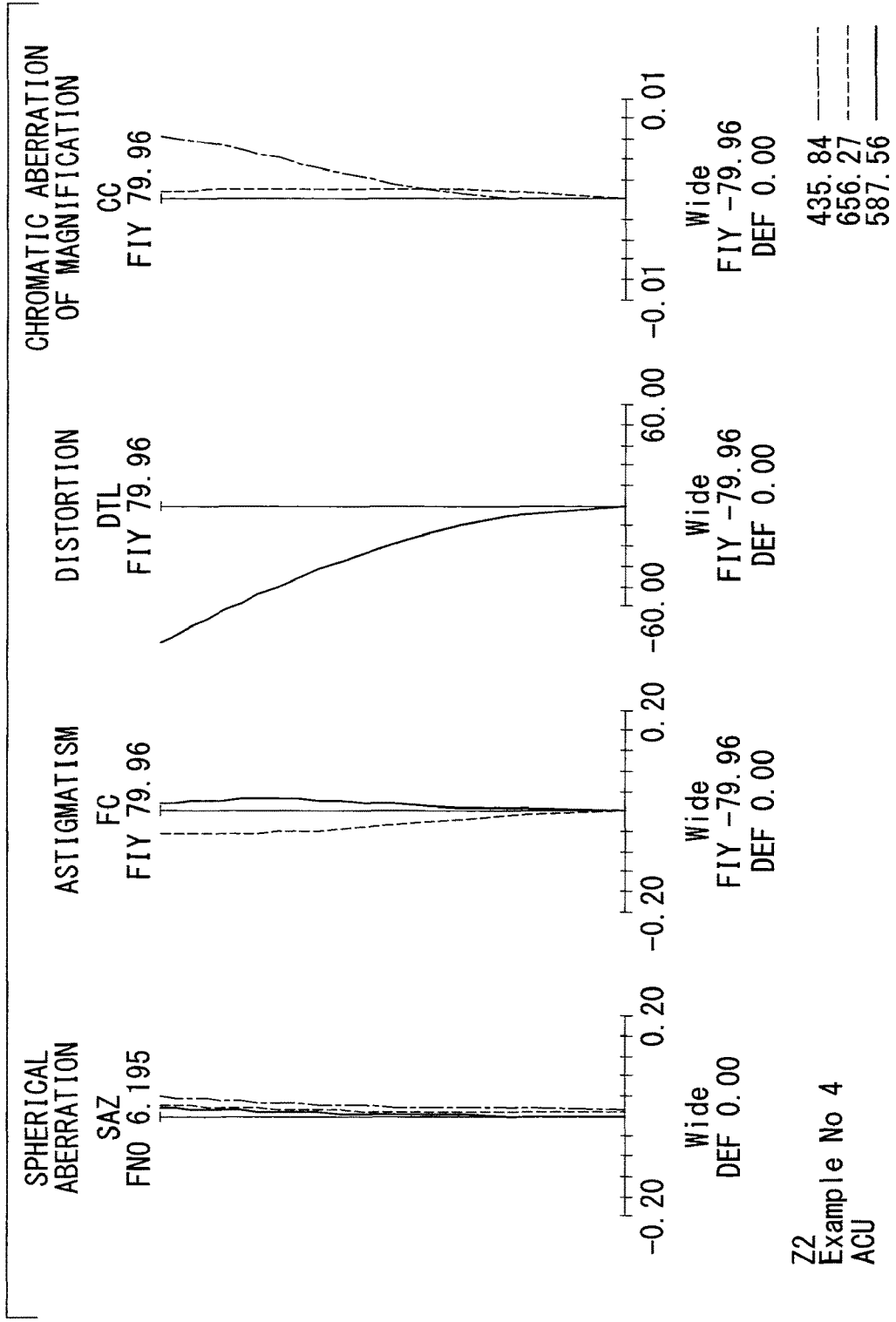
FIG. 13 shows graphs of aberrations in the normal view state in the objective optical system according to Example 4 of the present invention.
Figure 14:
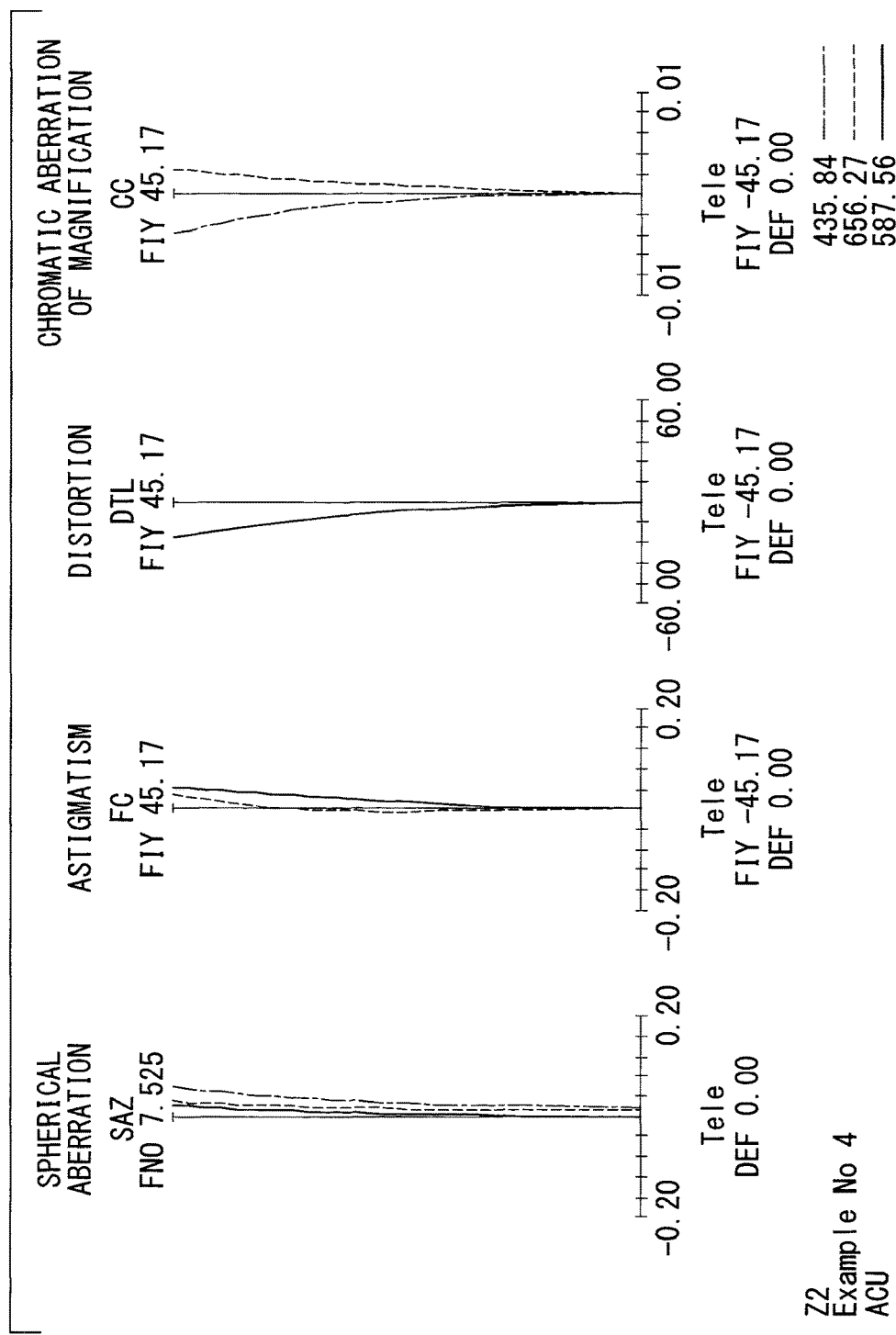
FIG. 14 shows graphs of aberrations in the magnified view state in the objective optical system according to Example 4 of the present invention.

FIG. 12 shows a cross-sectional view of the overall configuration of an objective optical system according to Example 4 of the present invention, FIGS. 13 and 14 show aberration charts, and lens data of the objective optical system according Example 4 is shown below.

Lens data

| Surface Number | r | d | Nd | Vd |
|---|---|---|---|---|
| 1 | ∞ | 0.35 | 1.88300 | 40.76 |
| 2 | 1.139 | 0.85 | | |
| 3 | ∞ | 0.40 | 1.52100 | 65.12 |
| 4 | ∞ | 0.20 | | |
| 5 | −3.688 | 1.52 | 1.58144 | 40.75 |
| 6 | −2.511 | 0.30 | | |
| 7 | 19.344 | 0.80 | 1.58144 | 40.75 |
| 8 | −1.041 | 0.30 | 1.95906 | 17.47 |
| 9 | −1.693 | 0.05 | | |
| 10 | aperture stop | 0.03 | | |
| 11 | ∞ | D11 | | |
| 12 | ∞ | 0.30 | 1.77250 | 49.60 |
| 13 | 1.124 | 0.55 | 1.72825 | 28.46 |
| 14 | 3.702 | 0.10 | | |
| 15 | ∞ | D15 | | |
| 16 | 4.569 | 1.15 | 1.81600 | 46.62 |
| 17 | −6.842 | 0.05 | | |
| 18 | 3.908 | 1.53 | 1.61800 | 63.33 |
| 19 | −2.836 | 0.35 | 1.95906 | 17.47 |
| 20 | 8.387 | 0.09 | | |
| 21 | ∞ | 0.10 | | |
| 22 | ∞ | 0.40 | 1.52300 | 58.59 |
| 23 | ∞ | 0.81 | | |
| 24 | ∞ | 0.75 | 1.51633 | 64.14 |
| 25 | ∞ | 0.01 | 1.51300 | 64.01 |
| 26 | ∞ | 0.65 | 1.50510 | 63.26 |
| 27 | ∞ | | | |

Zoom data

| | Normal View state | Magnified view state |
|---|---|---|
| Focal length | 1.15 | 1.40 |
| FNO. | 6.20 | 7.53 |
| Angle of observation field 2ω | 59.91 | 90.33 |

-continued

| Various data | | |
|---|---|---|
| D11 | 0.31 | 1.71 |
| D15 | 1.72 | 0.32 |

| Focal length of each group | | |
|---|---|---|
| First group | Second group | Third group |
| 1.92 | −4.19 | 3.14 |

Example 5

Figure 15:
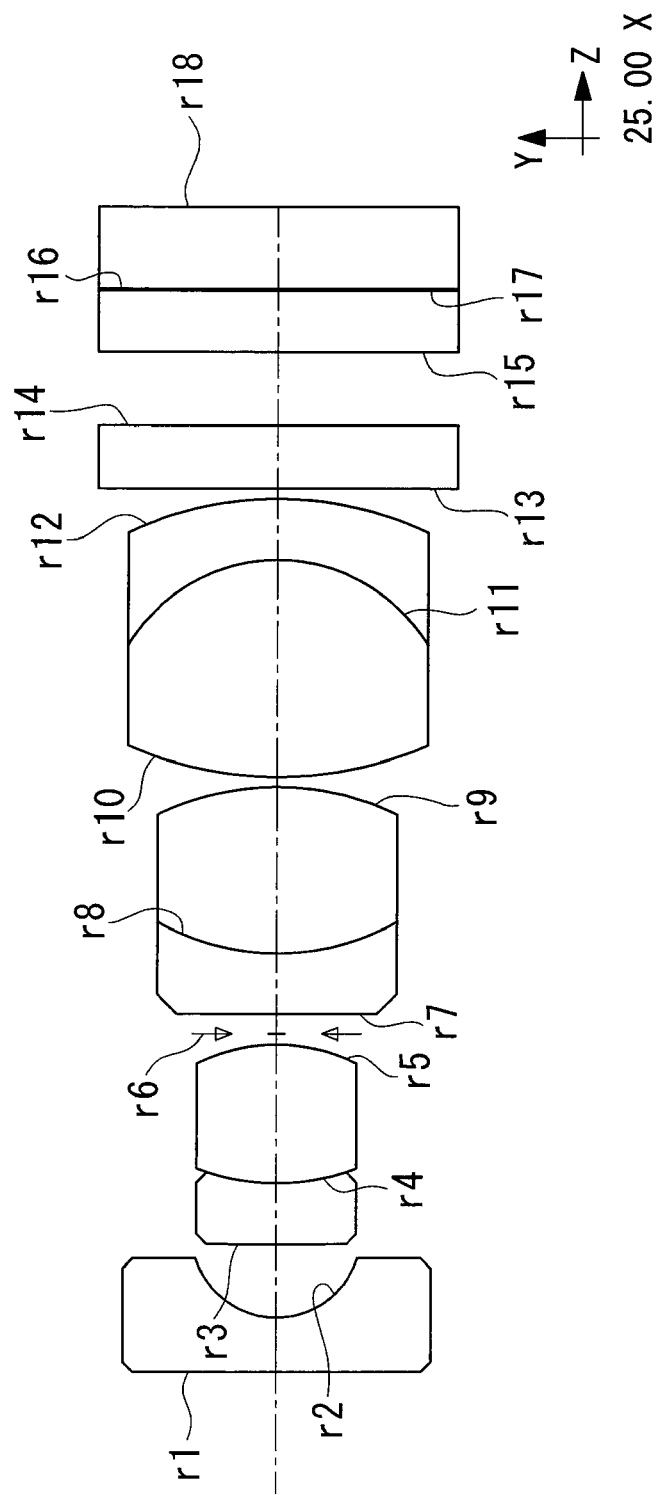
FIG. 15 is a cross-sectional view of the overall structure of an objective optical system according to Example 5 of the present invention.
Figure 16:
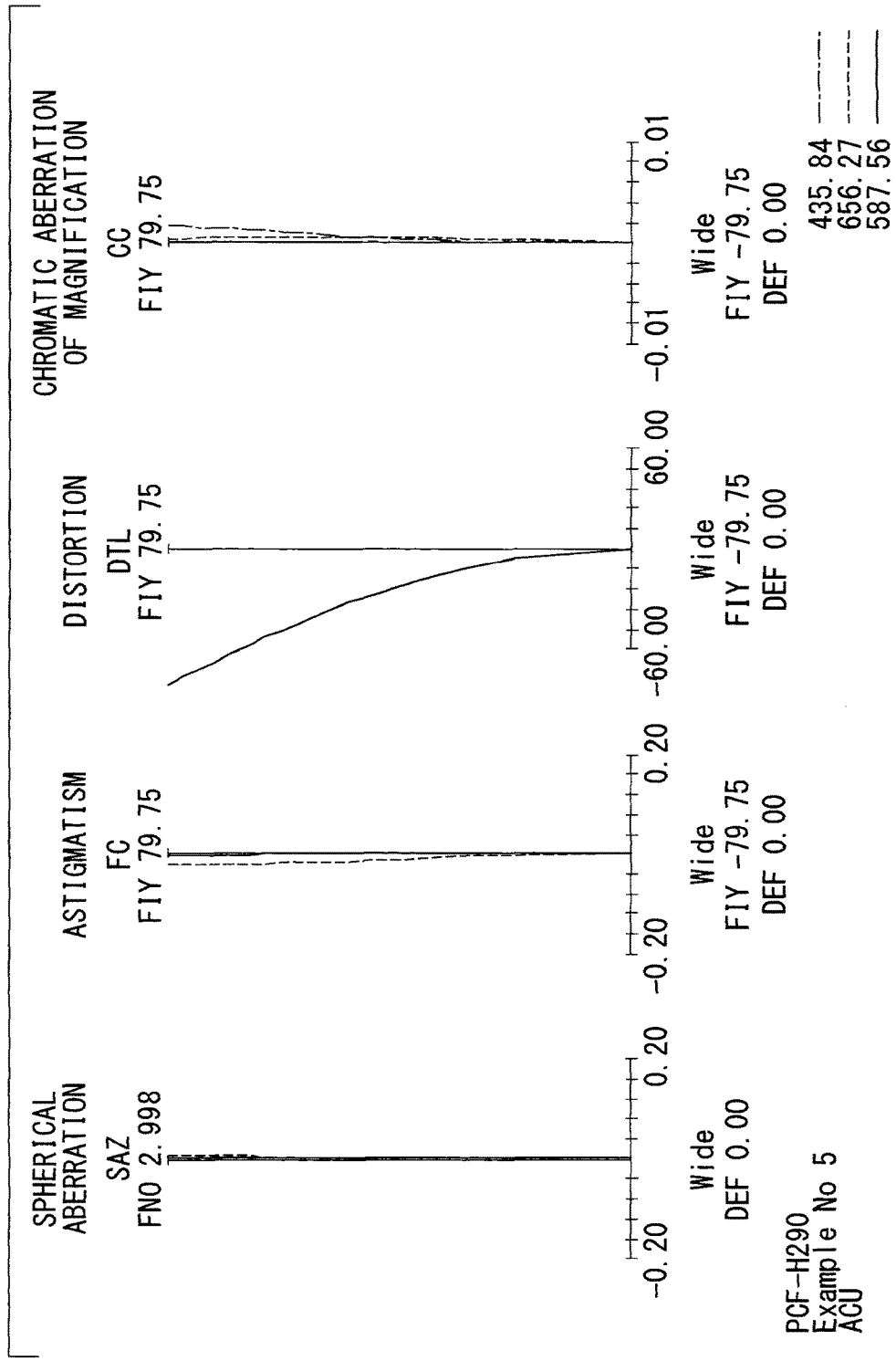
FIG. 16 shows graphs of aberrations of the objective optical system according to Example 5 of the present invention.

FIG. 15 shows a cross-sectional view of the overall configuration of an objective optical system according to Example 5 of the present invention, FIG. 16 shows aberration charts, and lens data of the objective optical system according Example 5 is shown below.

| Lens data | | | | |
|---|---|---|---|---|
| Surface Number | r | d | Nd | Vd |
| 1 | ∞ | 0.27 | 1.88300 | 40.76 |
| 2 | 0.427 | 0.36 | | |
| 3 | 22.369 | 0.30 | 1.88300 | 40.76 |
| 4 | 1.152 | 0.68 | 1.69895 | 30.13 |
| 5 | −0.908 | 0.05 | | |
| 6 | aperture stop | 0.10 | | |
| 7 | 449.945 | 0.30 | 1.88300 | 40.76 |
| 8 | 1.223 | 0.82 | 1.48749 | 70.23 |
| 9 | −1.385 | 0.05 | | |
| 10 | 1.912 | 1.06 | 1.72916 | 54.68 |
| 11 | −0.884 | 0.30 | 1.95906 | 17.47 |
| 12 | −1.771 | 0.05 | | |
| 13 | ∞ | 0.31 | 1.51400 | 85.67 |
| 14 | ∞ | 0.36 | | |
| 15 | ∞ | 0.30 | 1.51633 | 64.14 |
| 16 | ∞ | 0.01 | 1.51300 | 64.01 |
| 17 | ∞ | 0.40 | 1.50510 | 63.26 |
| 18 | ∞ | | | |

| Various data | |
|---|---|
| Focal length | 0.45 |
| FNO. | 3.00 |
| Angle of observation field 2ω | 159.51 |

| Focal length of each group | |
|---|---|
| Front group | Rear group |
| −43.52 | 1.33 |

Example 6

Figure 17:
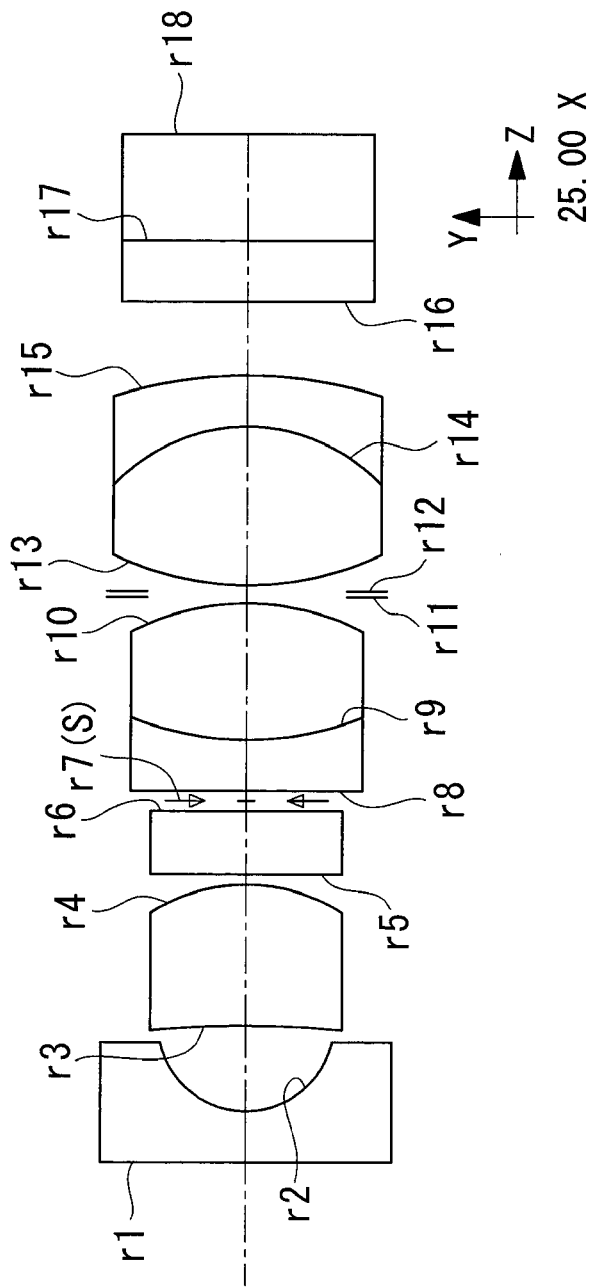
FIG. 17 is a cross-sectional view of the overall structure of an objective optical system according to Example 6 of the present invention.

FIG. 17 shows a cross-sectional view of the overall configuration of an objective optical system according to Example 6 of the present invention, FIG. 18 shows aberration charts, and lens data of the objective optical system according Example 6 is shown below.

| Lens data | | | | |
|---|---|---|---|---|
| Surface Number | r | d | Nd | Vd |
| 1 | ∞ | 0.25 | 1.88300 | 40.76 |
| 2 | 0.442 | 0.42 | | |
| 3 | −5.140 | 0.70 | 1.69895 | 30.13 |

-continued

| | | | | |
|---|---|---|---|---|
| 4 | −0.900 | 0.05 | | |
| 5 | ∞ | 0.31 | 1.51400 | 85.67 |
| 6 | ∞ | 0.05 | | |
| 7 | aperture stop | 0.05 | | |
| 8 | ∞ | 0.25 | 1.88300 | 40.76 |
| 9 | 1.578 | 0.67 | 1.51633 | 64.14 |
| 10 | −1.264 | 0.03 | | |
| 11 | ∞ | 0.03 | | |
| 12 | ∞ | 0.03 | | |
| 13 | 1.572 | 0.78 | 1.72916 | 54.68 |
| 14 | −0.925 | 0.25 | 1.95906 | 17.47 |
| 15 | −2.261 | 0.36 | | |
| 16 | ∞ | 0.30 | 1.51633 | 64.14 |
| 17 | ∞ | 0.52 | 1.50510 | 63.26 |
| 18 | ∞ | | | |

| Various data | |
|---|---|
| Focal length | 0.44 |
| FNO. | 2.99 |
| Angle of observation field 2ω | 162.55 |

| Focal length of each group | |
|---|---|
| Front group | Rear group |
| −10.3449 | 1.2124 |

Example 7

Figure 19A:
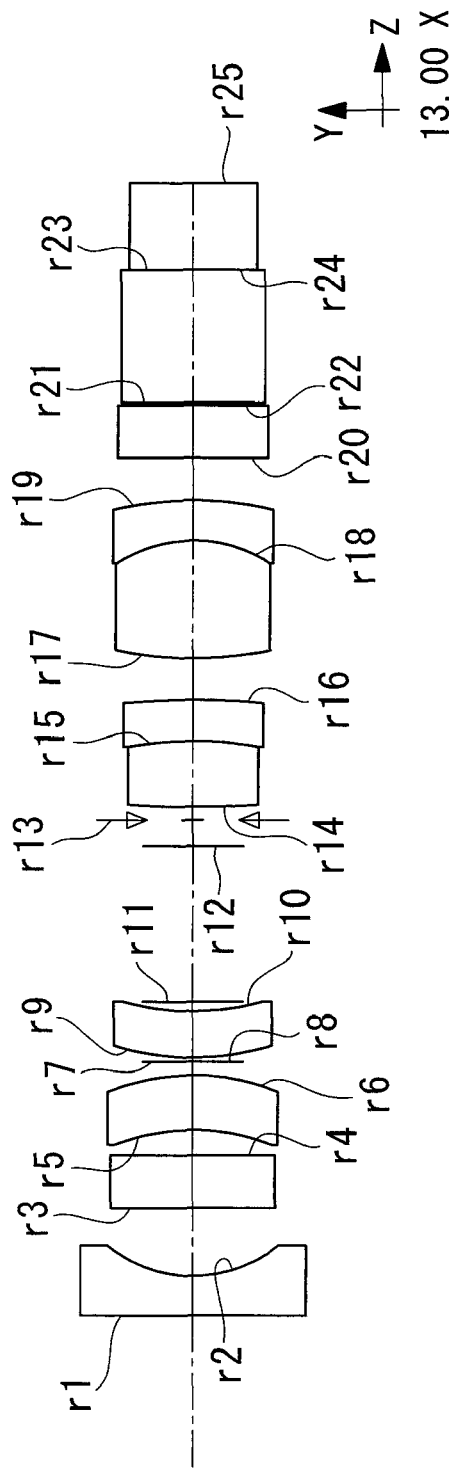
FIG. 19A depicts cross-sectional views of the overall structure of an objective optical system according to Example 7 of the present invention when the optical system is in a normal view state.
Figure 19B:
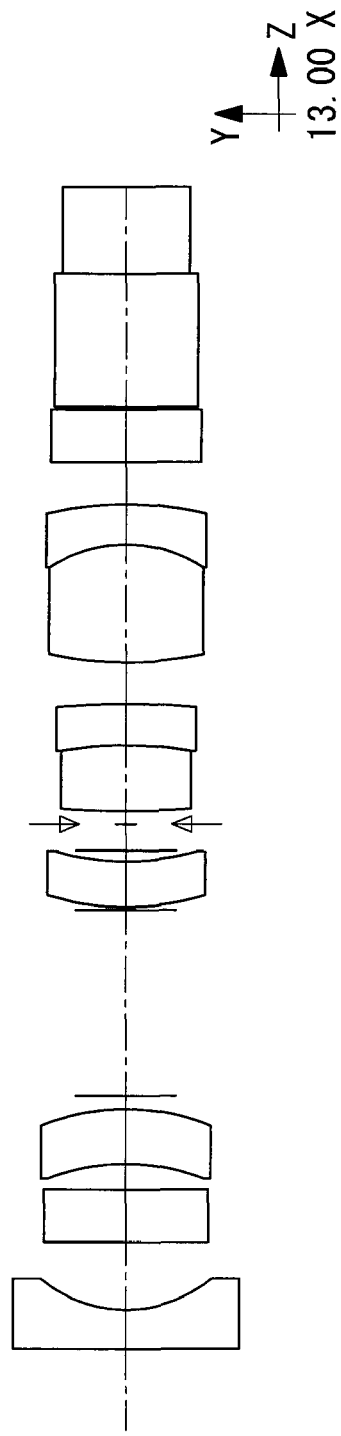
FIG. 19B depicts cross-sectional views of the overall structure of an objective optical system according to Example 7 of the present invention when the optical system is in a magnified view state.
Figure 20:
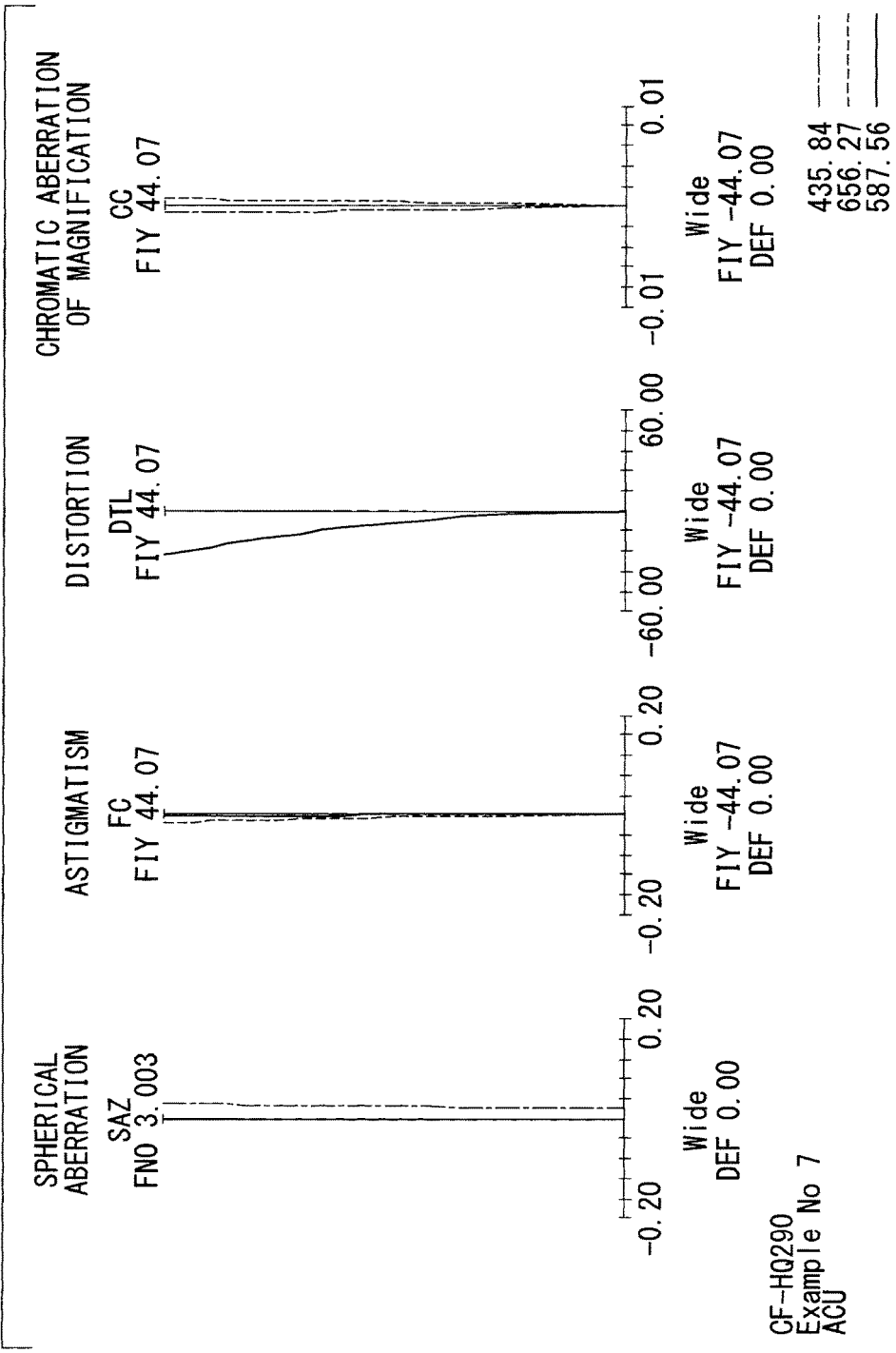
FIG. 20 shows graphs of aberrations in the normal view state in the objective optical system according to Example 7 of the present invention.
Figure 21:
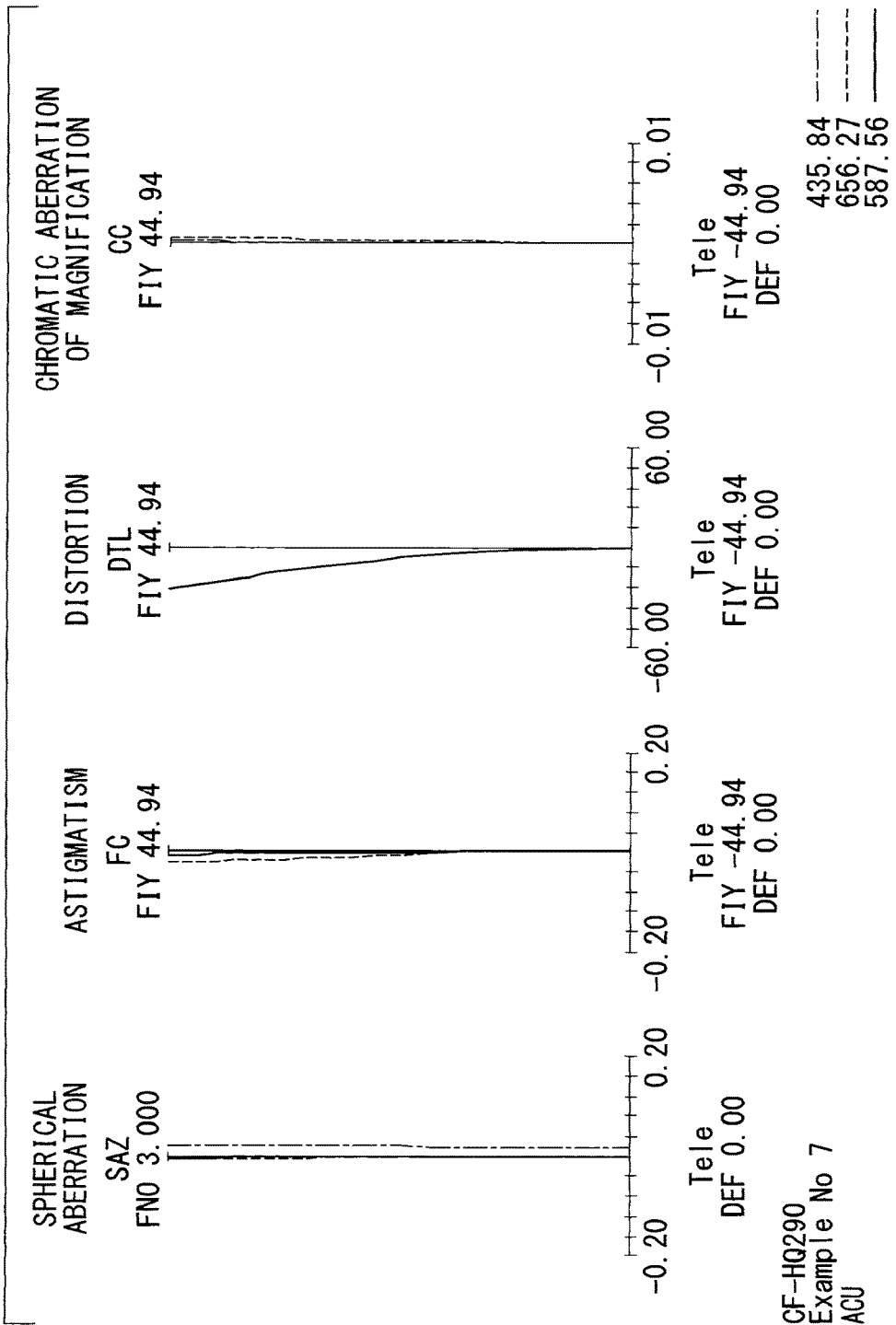
FIG. 21 shows graphs of aberrations in the magnified view state in the objective optical system according to Example 7 of the present invention.

FIG. 19 shows a cross-sectional view of the overall configuration of an objective optical system according to Example 7 of the present invention, FIGS. 20 and 21 show aberration charts, and lens data of the objective optical system according Example 7 is shown below.

| Lens data | | | | |
|---|---|---|---|---|
| Surface Number | r | d | Nd | Vd |
| 1 | ∞ | 0.30 | 1.88300 | 40.76 |
| 2 | 1.044 | 0.51 | | |
| 3 | ∞ | 0.40 | 1.52100 | 65.12 |
| 4 | ∞ | 0.19 | | |
| 5 | −1.668 | 0.41 | 1.84666 | 23.78 |
| 6 | −1.756 | 0.10 | | |
| 7 | ∞ | 0.01 | | |
| 8 | ∞ | 0.02 | | |
| 9 | 2.070 | 0.35 | 1.84666 | 23.78 |
| 10 | 2.000 | 0.07 | | |
| 11 | ∞ | 1.18 | | |
| 12 | ∞ | 0.20 | | |
| 13 | aperture stop | 0.10 | | |
| 14 | 6.829 | 0.50 | 1.88300 | 40.76 |
| 15 | −2.715 | 0.31 | 1.71999 | 50.23 |
| 16 | −5.630 | 0.31 | | |
| 17 | 2.888 | 0.89 | 1.72916 | 54.68 |
| 18 | −1.087 | 0.30 | 1.95906 | 17.47 |
| 19 | −2.708 | 0.32 | | |
| 20 | ∞ | 0.40 | 1.52300 | 58.59 |
| 21 | ∞ | 0.02 | | |
| 22 | ∞ | 1.00 | 1.51633 | 64.14 |
| 23 | ∞ | 0.00 | 1.51300 | 64.01 |
| 24 | ∞ | 0.65 | 1.50510 | 63.26 |
| 25 | ∞ | | | |

| Zoom data | | |
|---|---|---|
| | Normal View state | Magnified view state |
| Focal length | 0.64 | 0.62 |
| FNO. | 3.00 | 3.00 |
| Angle of observation field 2ω | 88.15 | 89.87 |

-continued

| Various data | | |
|---|---|---|
| D7 | 0.01 | 1.41 |
| D11 | 1.18 | 0.01 |

| Focal length of each group | | |
|---|---|---|
| First group | Second group | Third group |
| −1.43 | 54.09 | 1.73 |

Example 8

Figure 22:
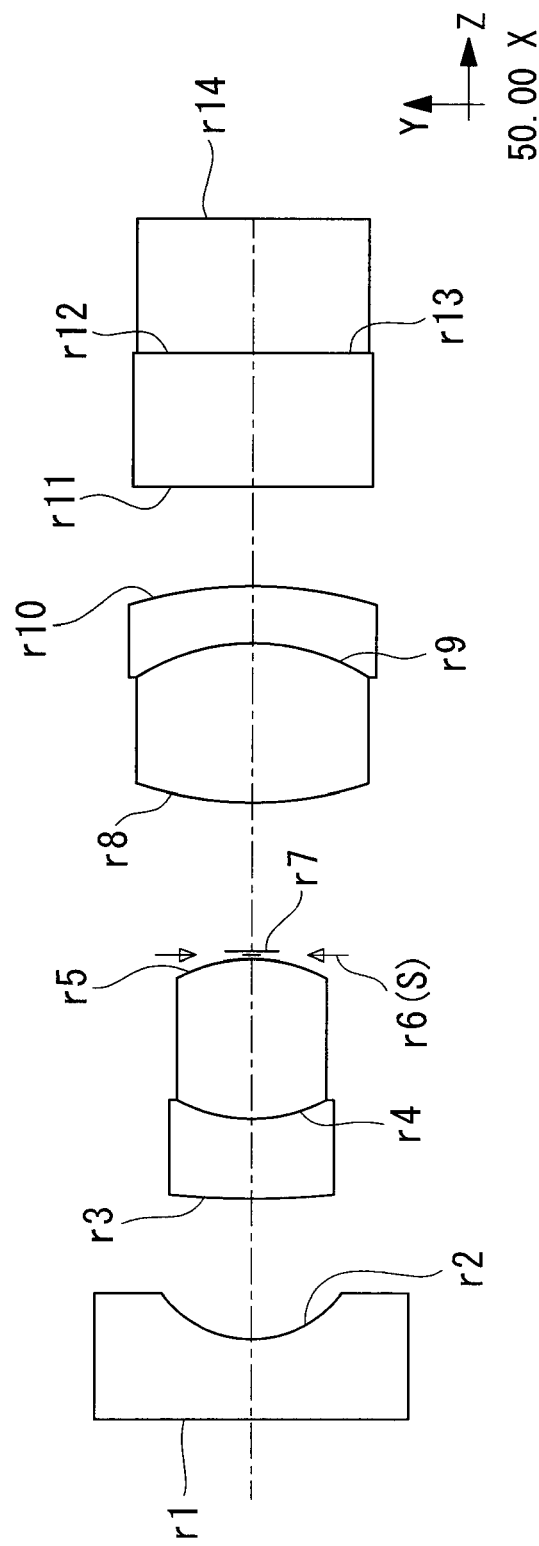
FIG. 22 is a cross-sectional view of the overall structure of an objective optical system according to Example 8 of the present invention.
Figure 23:
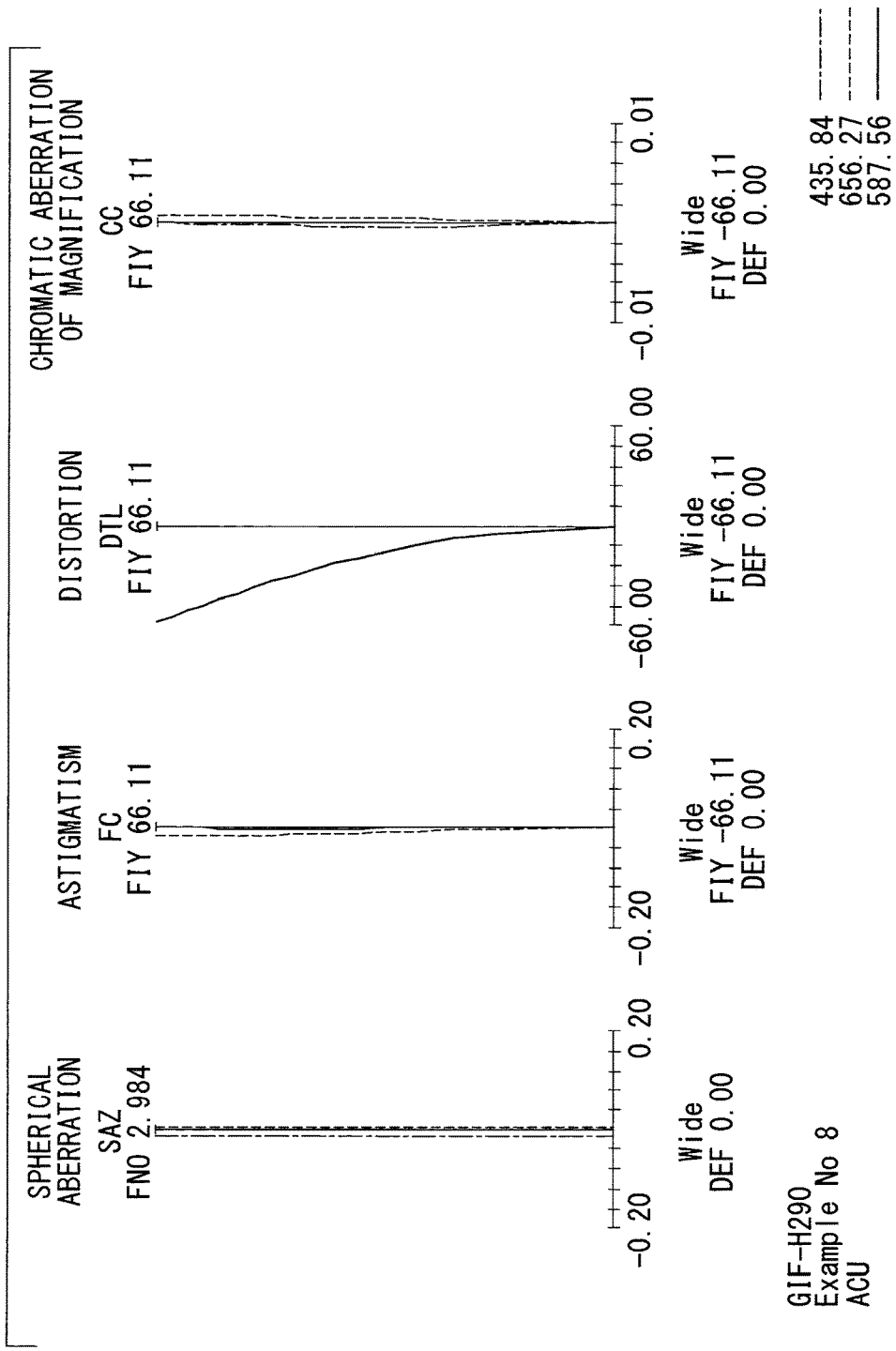
FIG. 23 shows graphs of aberrations of the objective optical system according to Example 8 of the present invention.

FIG. 22 shows a cross-sectional view of the overall configuration of an objective optical system according to Example 8 of the present invention, FIG. 23 shows aberration charts, and lens data of the objective optical system according Example 8 is shown below.

| Lens data | | | | |
|---|---|---|---|---|
| Surface Number | r | d | Nd | Vd |
| 1 | ∞ | 0.30 | 1.88300 | 40.76 |
| 2 | 0.427 | 0.52 | | |
| 3 | 2.314 | 0.30 | 1.88300 | 40.76 |
| 4 | 0.650 | 0.60 | 1.62004 | 36.26 |
| 5 | −0.738 | 0.02 | | |
| 6 | aperture stop | 0.01 | | |
| 7 | ∞ | 0.55 | | |
| 8 | 1.578 | 0.60 | 1.72916 | 54.68 |
| 9 | −0.800 | 0.20 | 1.95906 | 17.47 |
| 10 | −2.029 | 0.38 | | |
| 11 | ∞ | 0.50 | 1.51633 | 64.14 |
| 12 | ∞ | 0.00 | 1.51300 | 64.01 |
| 13 | ∞ | 0.50 | 1.50510 | 63.26 |
| 14 | ∞ | | | |

| Various data | |
|---|---|
| Focal length | 0.48 |
| FNO. | 2.98 |
| Angle of observation field 2ω | 132.22 |

| Focal length of each group | |
|---|---|
| Front group | Rear group |
| 2.55 | 1.65 |

Example 9

Figure 24:
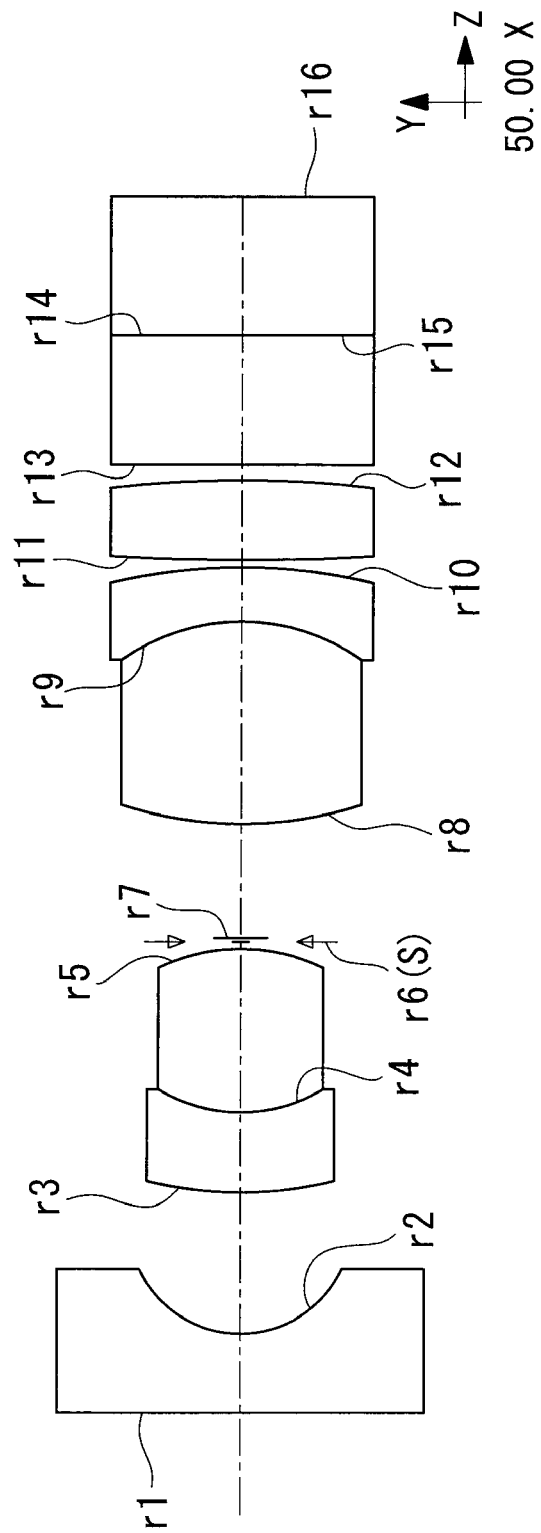
FIG. 24 is a cross-sectional view of the overall structure of an objective optical system according to Example 9 of the present invention.
Figure 25:
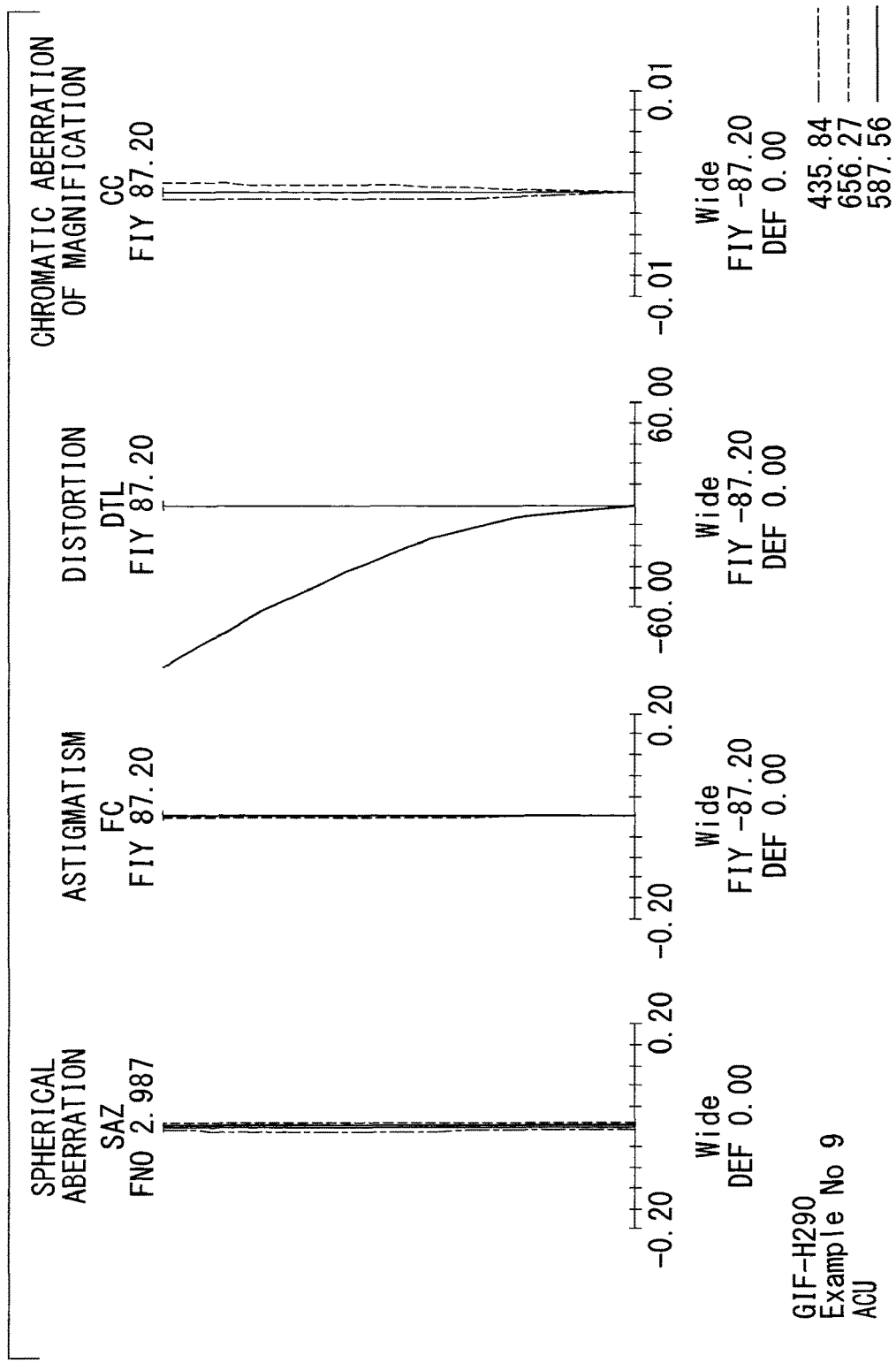
FIG. 25 shows graphs of aberrations of the objective optical system according to Example 9 of the present invention.

FIG. 24 shows a cross-sectional view of the overall configuration of an objective optical system according to Example 9 of the present invention, FIG. 25 shows aberration charts, and lens data of the objective optical system according Example 9 is shown below.

| Lens data | | | | |
|---|---|---|---|---|
| Surface Number | r | d | Nd | Vd |
| 1 | ∞ | 0.30 | 1.88300 | 40.76 |
| 2 | 0.427 | 0.54 | | |
| 3 | 2.638 | 0.30 | 1.88300 | 40.76 |
| 4 | 0.650 | 0.60 | 1.62004 | 36.26 |
| 5 | −0.729 | 0.02 | | |
| 6 | aperture stop | 0.01 | | |
| 7 | ∞ | 0.44 | | |
| 8 | 1.562 | 0.75 | 1.72916 | 54.68 |
| 9 | −0.800 | 0.20 | 1.95906 | 17.47 |
| 10 | −2.453 | 0.02 | | |
| 11 | 7.876 | 0.30 | 1.51633 | 64.14 |
| 12 | −5.104 | 0.06 | | |
| 13 | ∞ | 0.50 | 1.51633 | 64.14 |
| 14 | ∞ | 0.00 | 1.51300 | 64.01 |
| 15 | ∞ | 0.50 | 1.50510 | 63.26 |
| 16 | ∞ | D16 | | |

| Various data | |
|---|---|
| Focal length | 0.44 |
| FNO. | 2.99 |
| Angle of observation field 2ω | 174.40 |

| Focal length of each group | |
|---|---|
| Front group | Rear group |
| 2.49 | 1.53 |

Example 10

Figure 26:
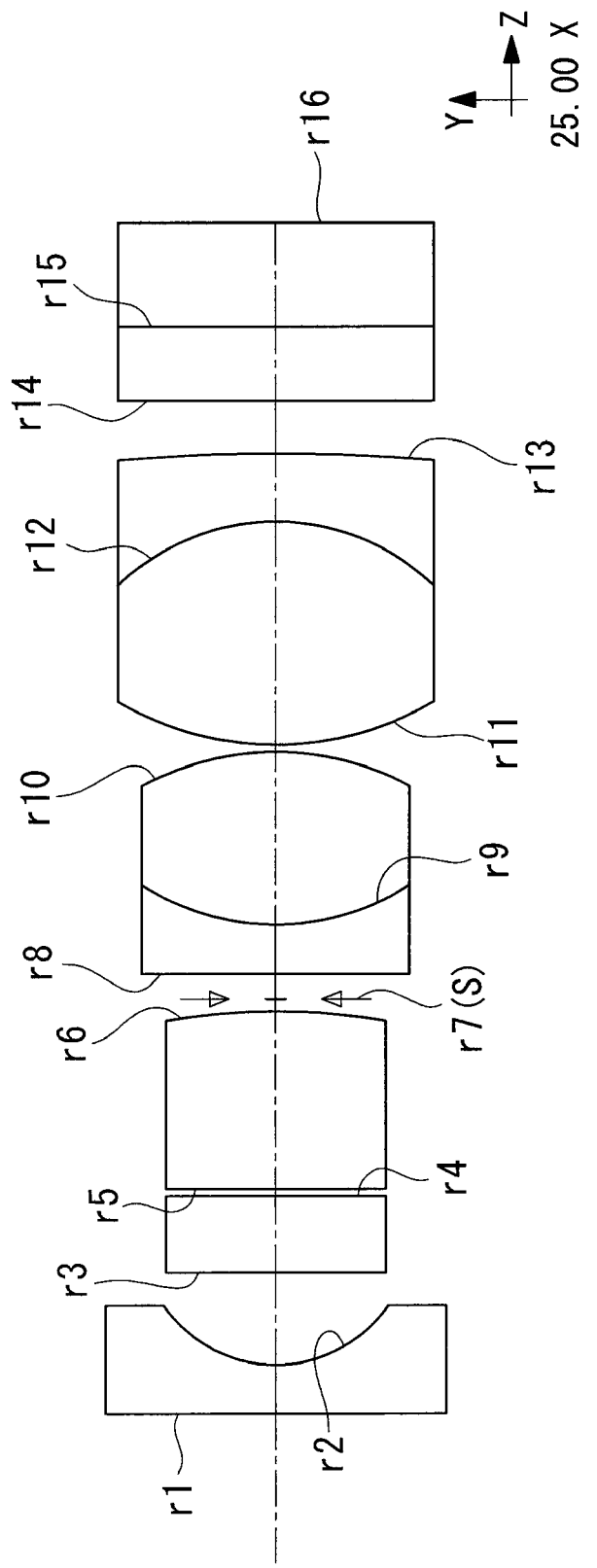
FIG. 26 is a cross-sectional view of the overall structure of an objective optical system according to Example 10 of the present invention.
Figure 27:
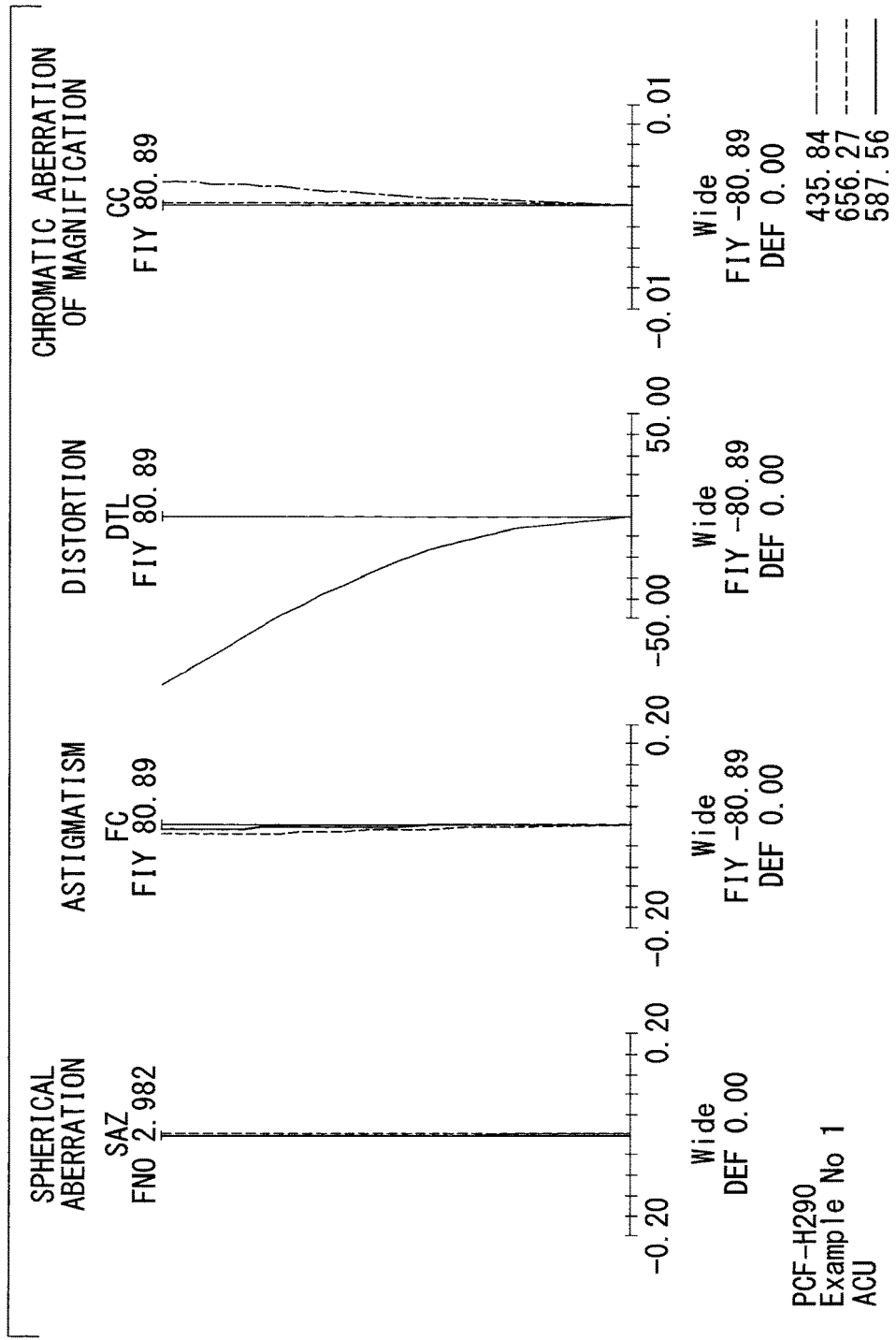
FIG. 27 shows graphs of aberrations of the objective optical system according to Example 10 of the present invention.

FIG. 26 shows a cross-sectional view of the overall configuration of an objective optical system according to Example 10 of the present invention, FIG. 27 shows aberration charts, and lens data of the objective optical system according Example 10 is shown below.

| Lens data | | | | |
|---|---|---|---|---|
| Surface Number | r | d | Nd | Vd |
| 1 | ∞ | 0.20 | 1.88300 | 40.76 |
| 2 | 0.561 | 0.37 | | |
| 3 | ∞ | 0.31 | 1.51400 | 85.67 |
| 4 | ∞ | 0.03 | | |
| 5 | ∞ | 0.72 | 1.95906 | 17.47 |
| 6 | −2.598 | 0.05 | | |
| 7 | aperture stop | 0.10 | | |
| 8 | ∞ | 0.20 | 1.88300 | 40.76 |
| 9 | 1.020 | 0.70 | 1.69680 | 55.53 |
| 10 | −1.169 | 0.03 | | |
| 11 | 1.290 | 0.90 | 1.72916 | 54.68 |
| 12 | −0.949 | 0.28 | 1.95906 | 17.47 |
| 13 | −7.770 | 0.21 | | |
| 14 | ∞ | 0.30 | 1.51633 | 64.14 |
| 15 | ∞ | 0.42 | 1.50510 | 63.26 |
| 16 | ∞ | | | |

| Various data | |
|---|---|
| Focal length | 0.44 |
| FNO. | 2.98 |
| Angle of observation field 2ω | 161.78 |

| Focal length of each group | |
|---|---|
| Front group | Rear group |
| −1.57 | 1.02 |

Example 11

Figure 28:
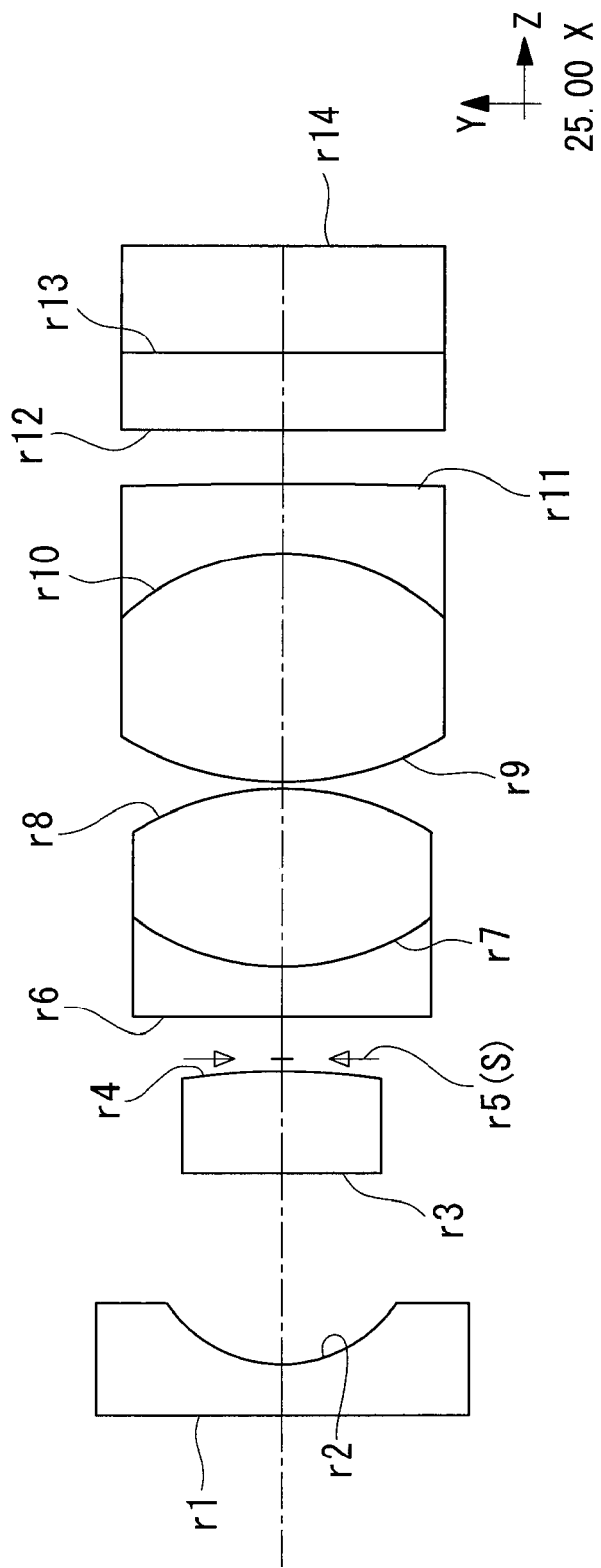
FIG. 28 is a cross-sectional view of the overall structure of an objective optical system according to Example 11 of the present invention.
Figure 29:
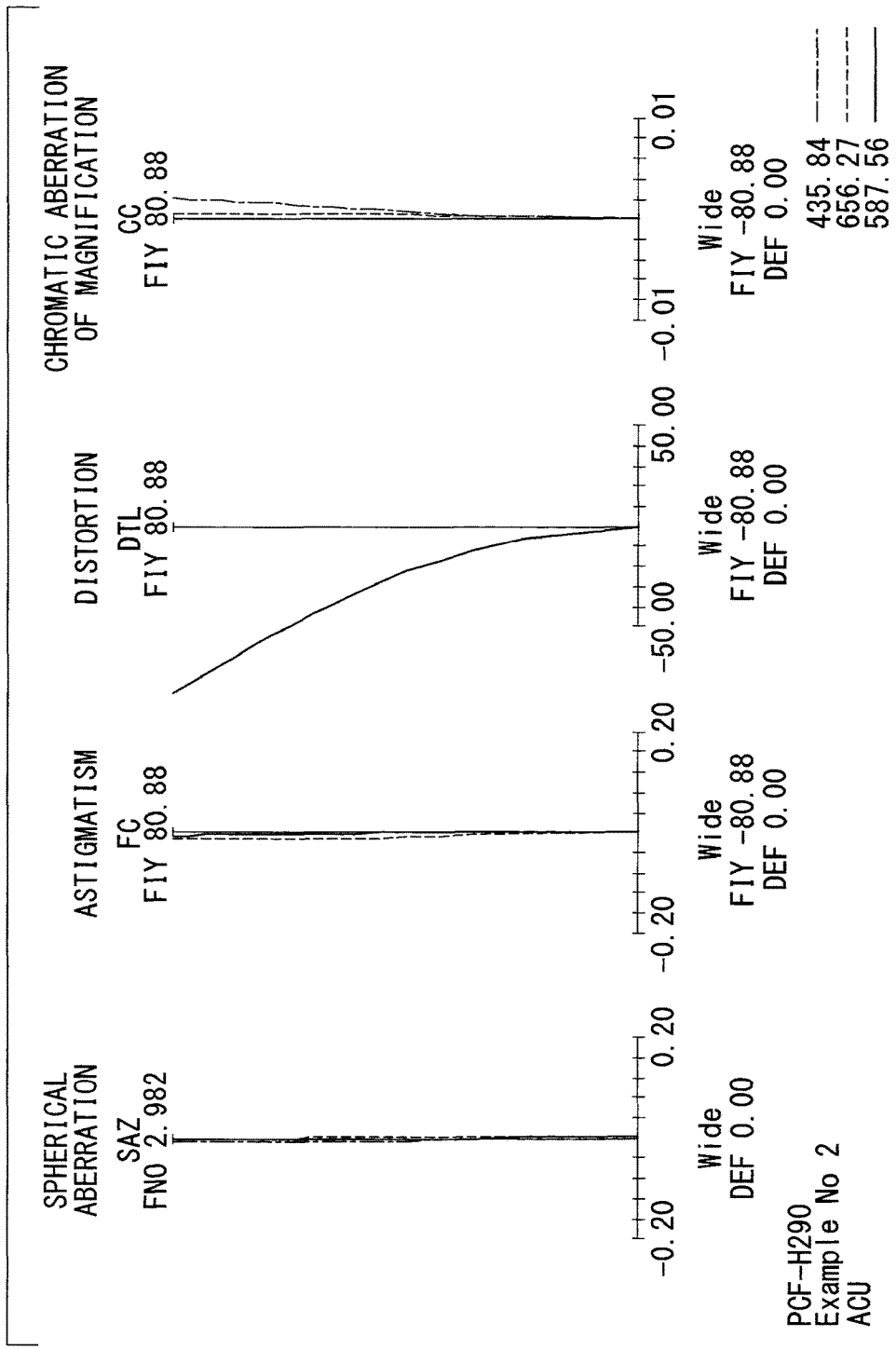
FIG. 29 shows graphs of aberrations of the objective optical system according to Example 11 of the present invention.

FIG. 28 shows a cross-sectional view of the overall configuration of an objective optical system according to Example 11 of the present invention, FIG. 29 shows aberration charts, and lens data of the objective optical system according Example 11 is shown below.

| Lens data | | | | |
|---|---|---|---|---|
| Surface Number | r | d | Nd | Vd |
| 1 | ∞ | 0.20 | 1.88300 | 40.76 |
| 2 | 0.561 | 0.76 | | |
| 3 | ∞ | 0.40 | 1.95906 | 17.47 |
| 4 | −2.691 | 0.05 | | |
| 5 | aperture stop | 0.17 | | |
| 6 | ∞ | 0.20 | 1.88300 | 40.76 |
| 7 | 1.020 | 0.70 | 1.69680 | 55.53 |
| 8 | −1.135 | 0.03 | | |
| 9 | 1.269 | 0.90 | 1.72916 | 54.68 |
| 10 | −0.949 | 0.28 | 1.95906 | 17.47 |
| 11 | −22.869 | 0.21 | | |
| 12 | ∞ | 0.30 | 1.51633 | 64.14 |
| 13 | ∞ | 0.42 | 1.50510 | 63.26 |
| 14 | ∞ | | | |

| Various data | |
|---|---|
| Focal length | 0.44 |
| FNO. | 2.98 |
| Angle of observation field 2ω | 161.76 |

| Focal length of each group | |
|---|---|
| Front group | Rear group |
| −1.47 | 1.02 |

Example 12

Figure 30:
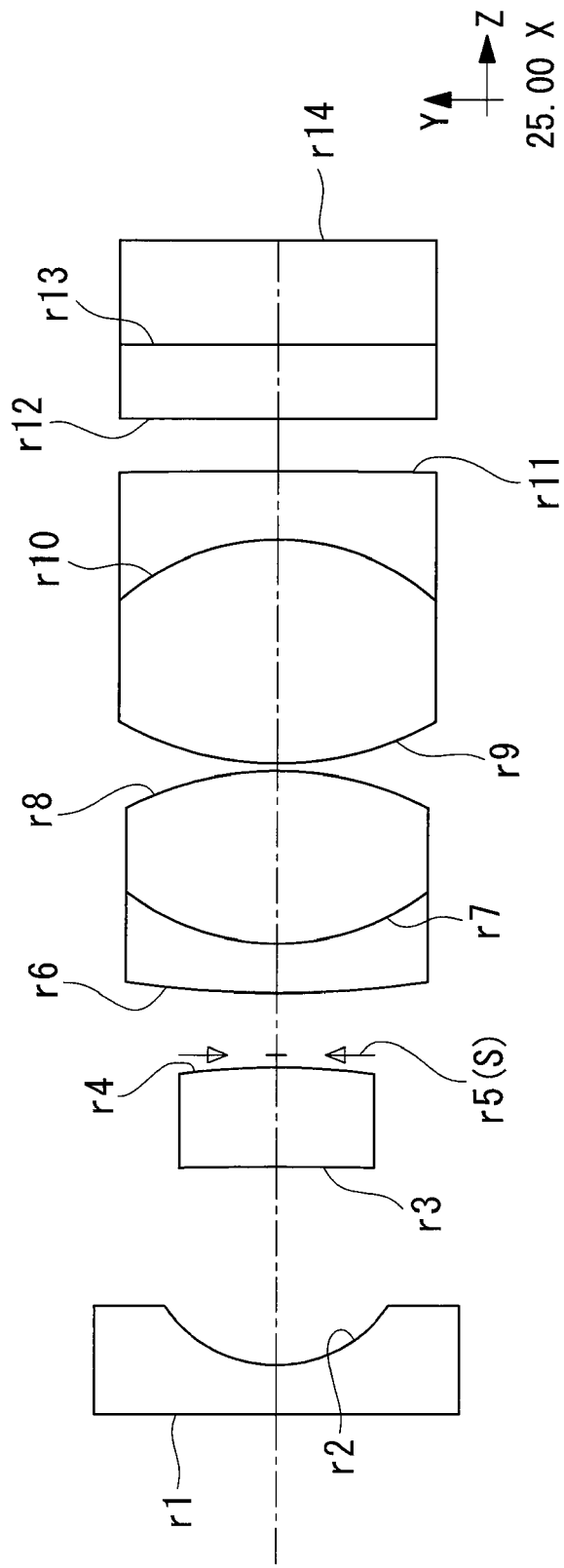
FIG. 30 is a cross-sectional view of the overall structure of an objective optical system according to Example 12 of the present invention.

FIG. 30 shows a cross-sectional view of the overall configuration of an objective optical system according to Example 12 of the present invention, FIG. 31 shows aberration charts, and lens data of the objective optical system according Example 12 is shown below.

| Lens data | | | | |
|---|---|---|---|---|
| Surface Number | r | d | Nd | Vd |
| 1 | ∞ | 0.20 | 1.88300 | 40.76 |
| 2 | 0.558 | 0.80 | | |
| 3 | −21.491 | 0.40 | 1.95906 | 17.47 |
| 4 | −2.925 | 0.05 | | |
| 5 | aperture stop | 0.25 | | |
| 6 | 4.374 | 0.20 | 1.88300 | 40.76 |
| 7 | 1.019 | 0.70 | 1.69680 | 55.53 |
| 8 | −1.346 | 0.03 | | |
| 9 | 1.331 | 0.90 | 1.72916 | 54.68 |
| 10 | −0.980 | 0.28 | 1.95906 | 17.47 |
| 11 | −36.237 | 0.21 | | |
| 12 | ∞ | 0.30 | 1.51633 | 64.14 |
| 13 | ∞ | 0.42 | 1.50510 | 63.26 |
| 14 | ∞ | | | |

| Various data | |
|---|---|
| Focal length | 0.45 |
| FNO. | 2.98 |
| Angle of observation field 2ω | 159.66 |

| Focal length of each group | |
|---|---|
| Front group | Rear group |
| −1.21 | 1.04 |

Example 13

Figure 33:
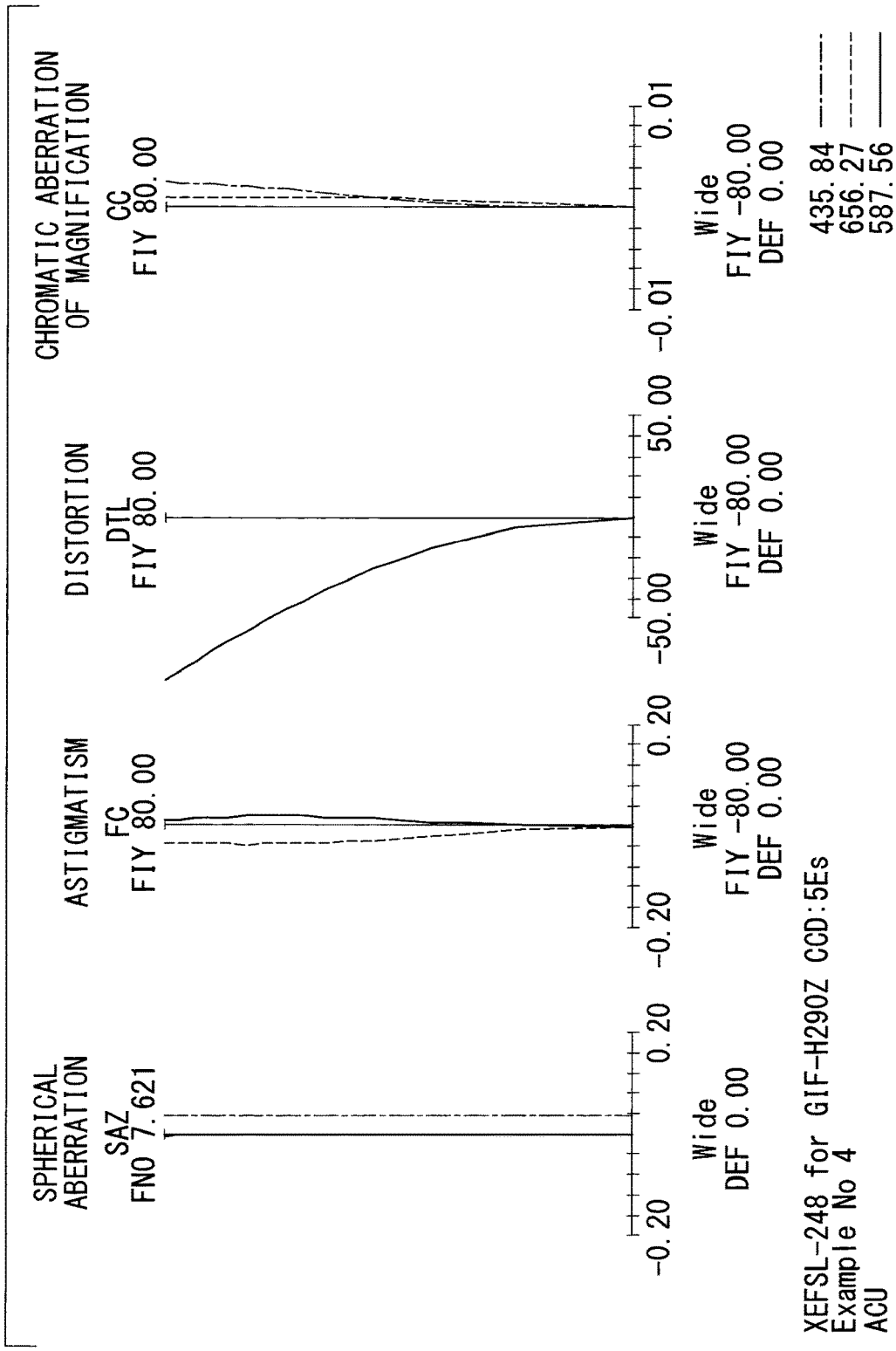
FIG. 33 shows graphs of aberrations in the normal view state in the objective optical system according to Example 13 of the present invention.
Figure 34:
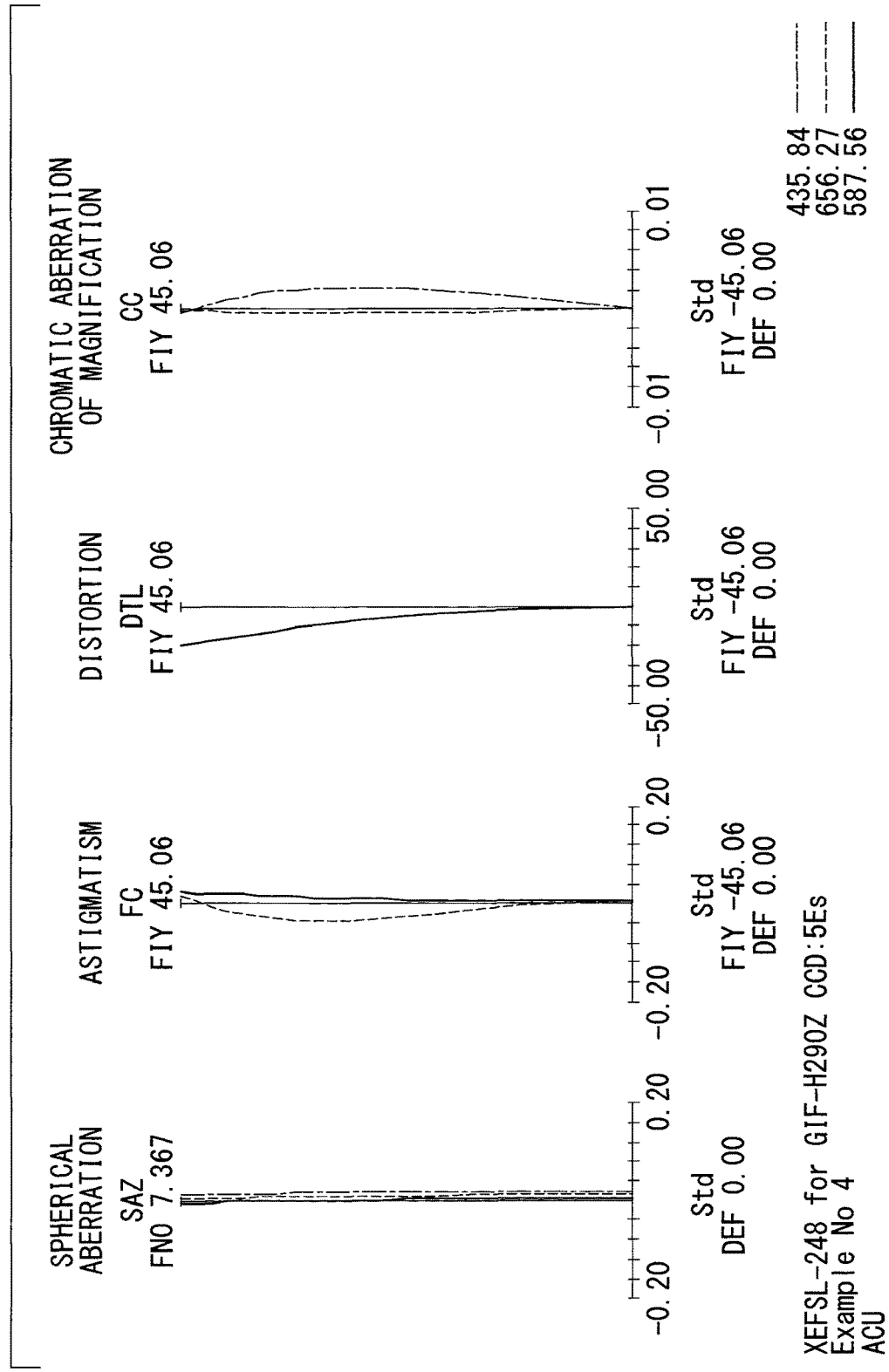
FIG. 34 shows graphs of aberrations in the magnified view state in the objective optical system according to Example 13 of the present invention.

FIG. 32 shows a cross-sectional view of the overall configuration of an objective optical system according to Example 13 of the present invention, FIGS. 33 and 34 show aberration charts, and lens data of the objective optical system according Example 13 is shown below.

| Lens data | | | | |
|---|---|---|---|---|
| Surface Number | r | d | Nd | Vd |
| 1 | ∞ | 0.35 | 1.88300 | 40.76 |
| 2 | 1.108 | 1.18 | | |
| 3 | −2.043 | 1.57 | 1.72916 | 54.68 |
| 4 | −2.391 | 0.05 | | |
| 5 | 5.855 | 1.03 | 1.77250 | 49.60 |
| 6 | −2.460 | 0.34 | 1.92286 | 18.90 |
| 7 | −4.244 | 0.20 | | |
| 8 | aperture stop | 0.03 | | |
| 9 | ∞ | 0.30 | 1.77250 | 49.60 |
| 10 | 1.358 | 0.50 | 1.59270 | 35.31 |
| 11 | 9.321 | 1.90 | | |
| 12 | 4.364 | 1.40 | 1.48749 | 70.23 |
| 13 | −3.267 | 0.05 | | |
| 14 | 5.198 | 1.70 | 1.48749 | 70.23 |
| 15 | −2.130 | 0.24 | 1.95906 | 17.47 |
| 16 | −5.691 | 0.30 | | |
| 17 | ∞ | 0.03 | | |
| 18 | ∞ | 0.40 | 1.52300 | 28.59 |
| 19 | ∞ | 0.72 | | |
| 20 | ∞ | 0.75 | 1.51633 | 64.14 |
| 21 | ∞ | 0.01 | 1.51300 | 64.01 |
| 22 | ∞ | 0.65 | 1.50510 | 63.26 |
| 23 | ∞ | | | |

| Zoom data | | |
|---|---|---|
| | Normal View state | Magnified view state |
| Focal length | 1.11 | 1.40 |
| FNO. | 7.62 | 7.37 |
| Angle of observation field 2ω | 159.99 | 90.11 |

| Various data | | |
|---|---|---|
| D7 | 0.20 | 1.80 |
| D11 | 1.90 | 0.30 |

| Focal length of each group | | |
|---|---|---|
| First group | Second group | Third group |
| 2.06 | −5.03 | 3.37 |

Example 14

Figure 35A:
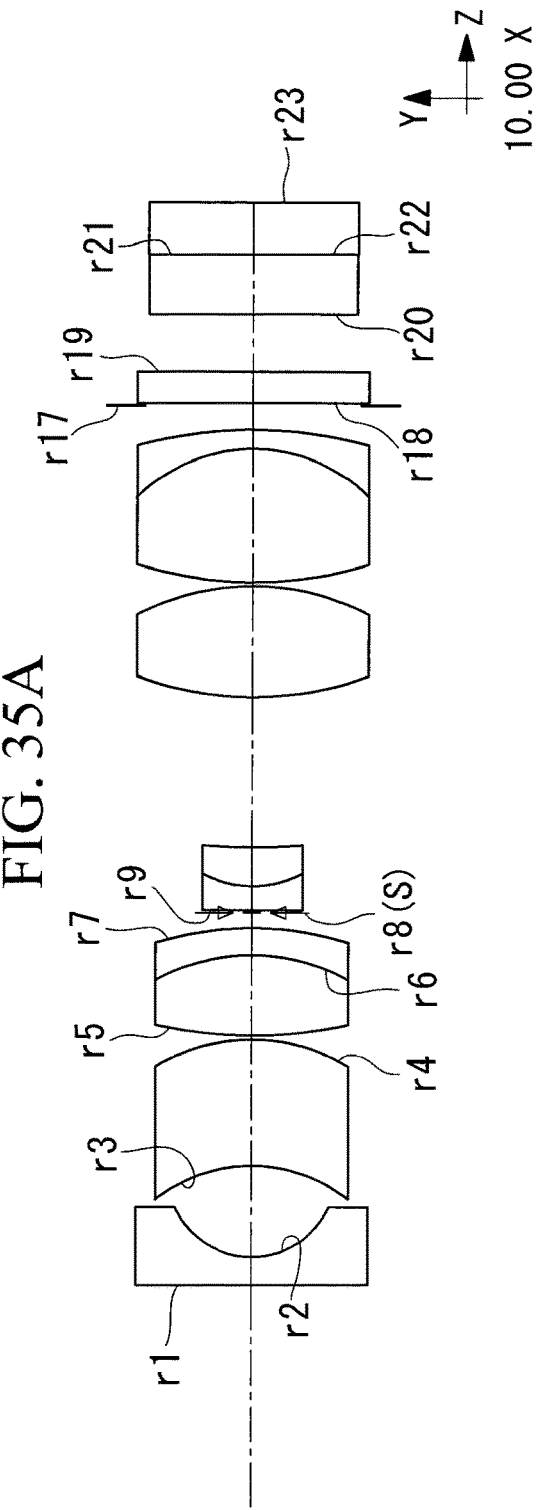
FIG. 35A depicts cross-sectional views of the overall structure of an objective optical system according to Example 14 of the present invention when the optical system is in a normal view state.
Figure 35B:
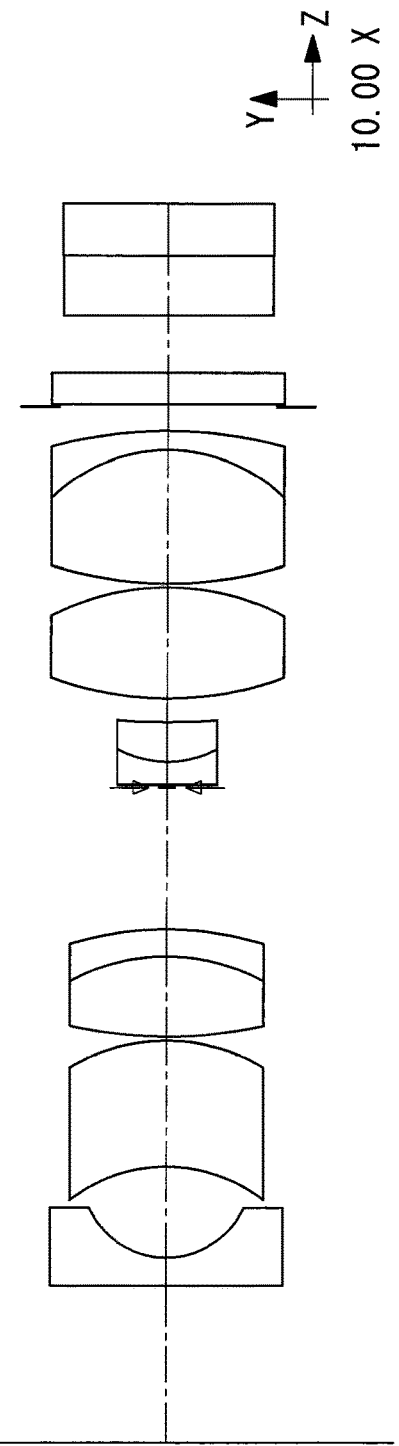
FIG. 35B depicts cross-sectional views of the overall structure of an objective optical system according to Example 14 of the present invention when the optical system is in a magnified view state.
Figure 37:
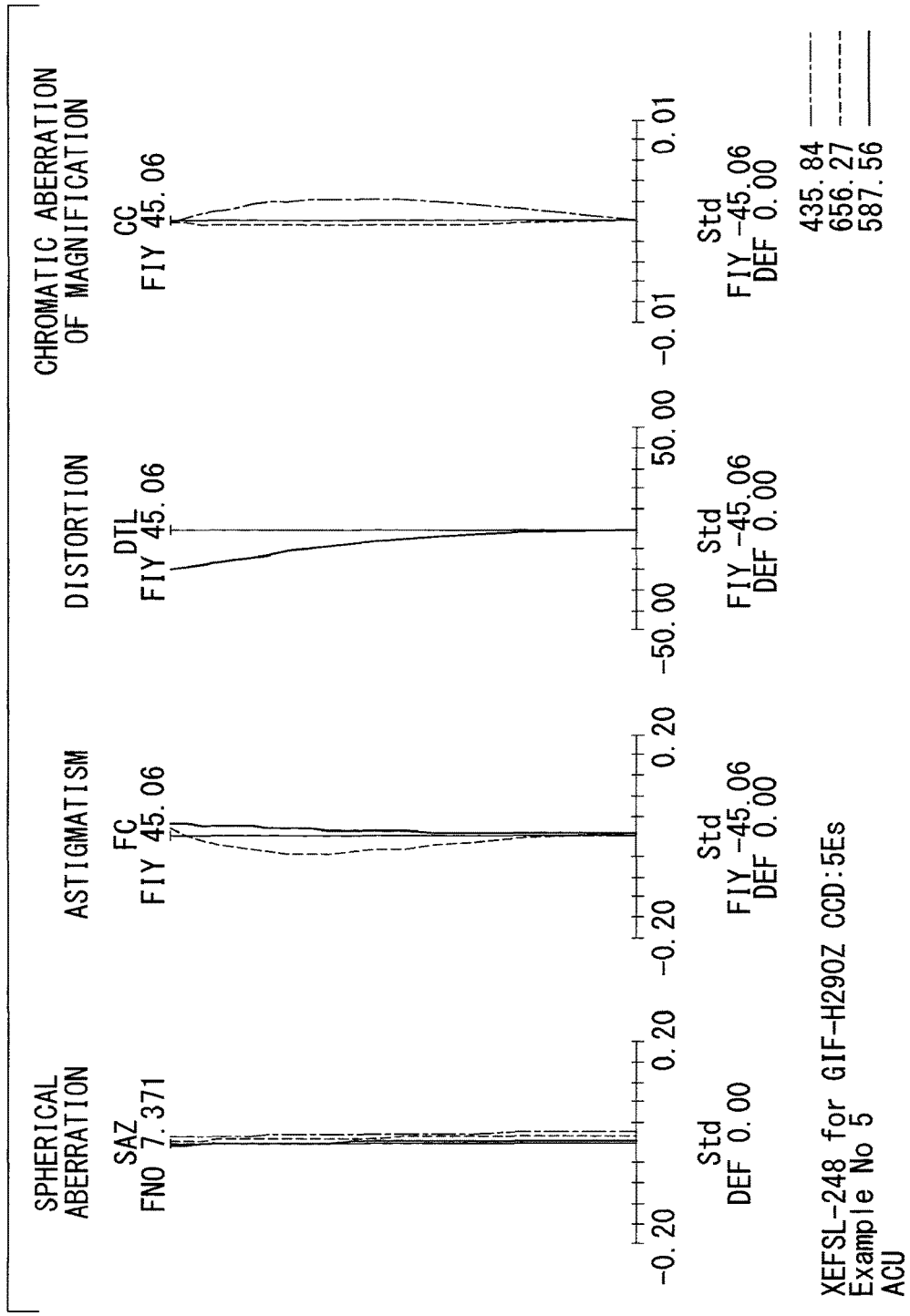
FIG. 37 shows graphs of aberrations in the magnified view state in the objective optical system according to Example 14 of the present invention.

FIG. 35 shows a cross-sectional view of the overall configuration of an objective optical system according to Example 14 of the present invention, FIGS. 36 and 37 show aberration charts, and lens data of the objective optical system according Example 14 is shown below.

| Lens data | | | | |
|---|---|---|---|---|
| Surface Number | r | d | Nd | Vd |
| 1 | ∞ | 0.35 | 1.88300 | 40.76 |
| 2 | 1.108 | 1.16 | | |
| 3 | −2.043 | 1.60 | 1.72916 | 54.68 |
| 4 | −2.419 | 0.05 | | |
| 5 | 5.700 | 1.03 | 1.77250 | 49.60 |
| 6 | −2.629 | 0.34 | 1.95906 | 17.47 |
| 7 | −4.273 | 0.20 | | |
| 8 | aperture stop | 0.03 | | |
| 9 | ∞ | 0.30 | 1.77250 | 49.60 |
| 10 | 1.352 | 0.50 | 1.59270 | 35.31 |
| 11 | 9.392 | 1.90 | | |

-continued

| | | | | |
|---|---|---|---|---|
| 12 | 4.363 | 1.40 | 1.48749 | 70.23 |
| 13 | −3.271 | 0.05 | | |
| 14 | 5.197 | 1.70 | 1.48749 | 70.23 |
| 15 | −2.130 | 0.24 | 1.95906 | 17.47 |
| 16 | −5.686 | 0.30 | | |
| 17 | ∞ | 0.03 | | |
| 18 | ∞ | 0.40 | 1.52300 | 58.59 |
| 19 | ∞ | 0.72 | | |
| 20 | ∞ | 0.75 | 1.51633 | 64.14 |
| 21 | ∞ | 0.01 | 1.51300 | 64.01 |
| 22 | ∞ | 0.65 | 1.50510 | 63.26 |
| 23 | ∞ | | | |

Zoom data

| | Normal View state | Magnified view state |
|---|---|---|
| Focal length | 1.11 | 1.40 |
| FNO. | 7.62 | 7.37 |
| Angle of observation field 2ω | 159.98 | 90.12 |

Various data

| | | |
|---|---|---|
| D7 | 0.20 | 1.80 |
| D11 | 1.90 | 0.30 |

Focal length of each group

| First group | Second group | Third group |
|---|---|---|
| 2.06 | −5.03 | 3.37 |

Example 15

Figure 39:
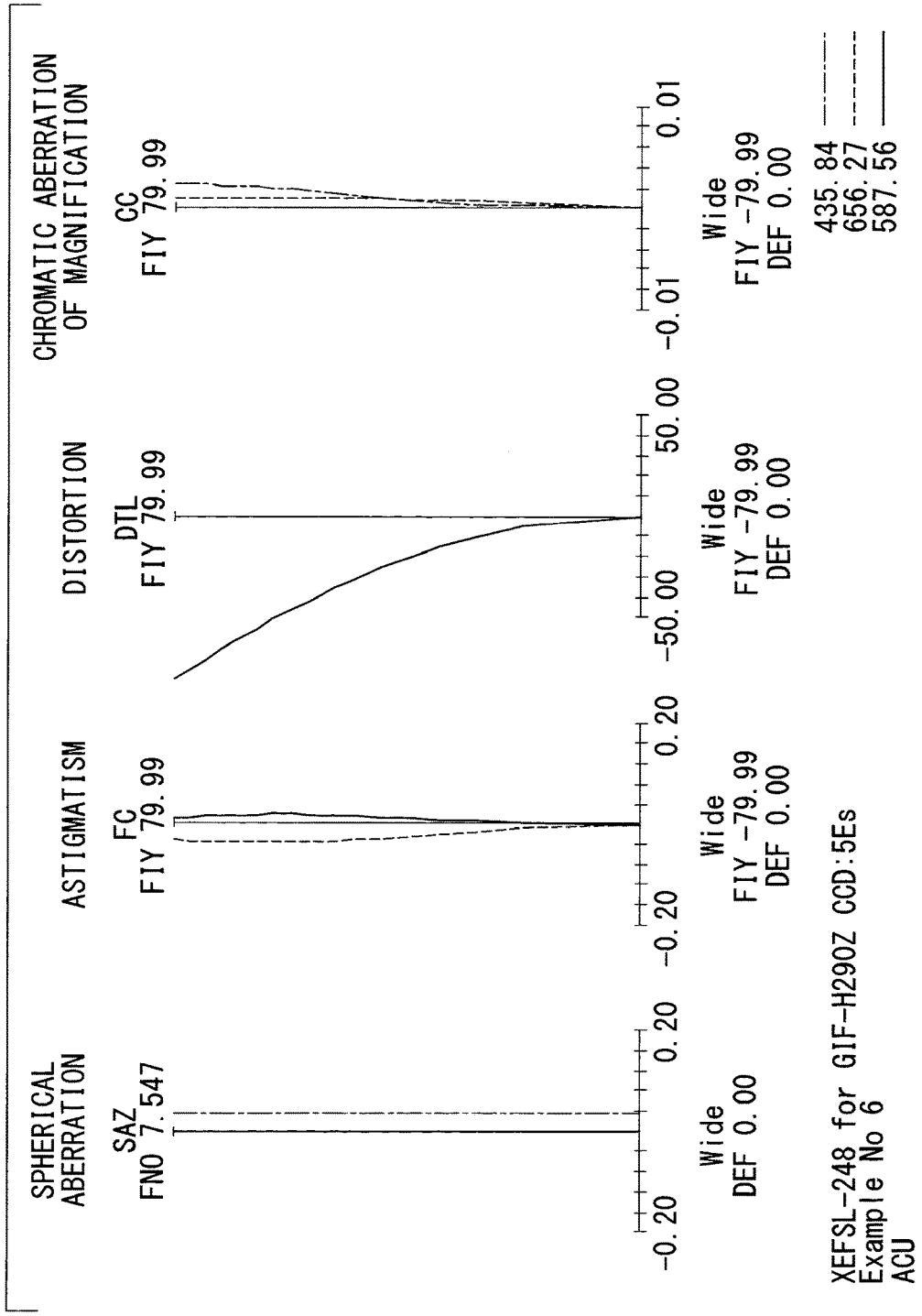
FIG. 39 shows graphs of aberrations in the normal view state of the objective optical system according to Example 15 of the present invention.
Figure 40:
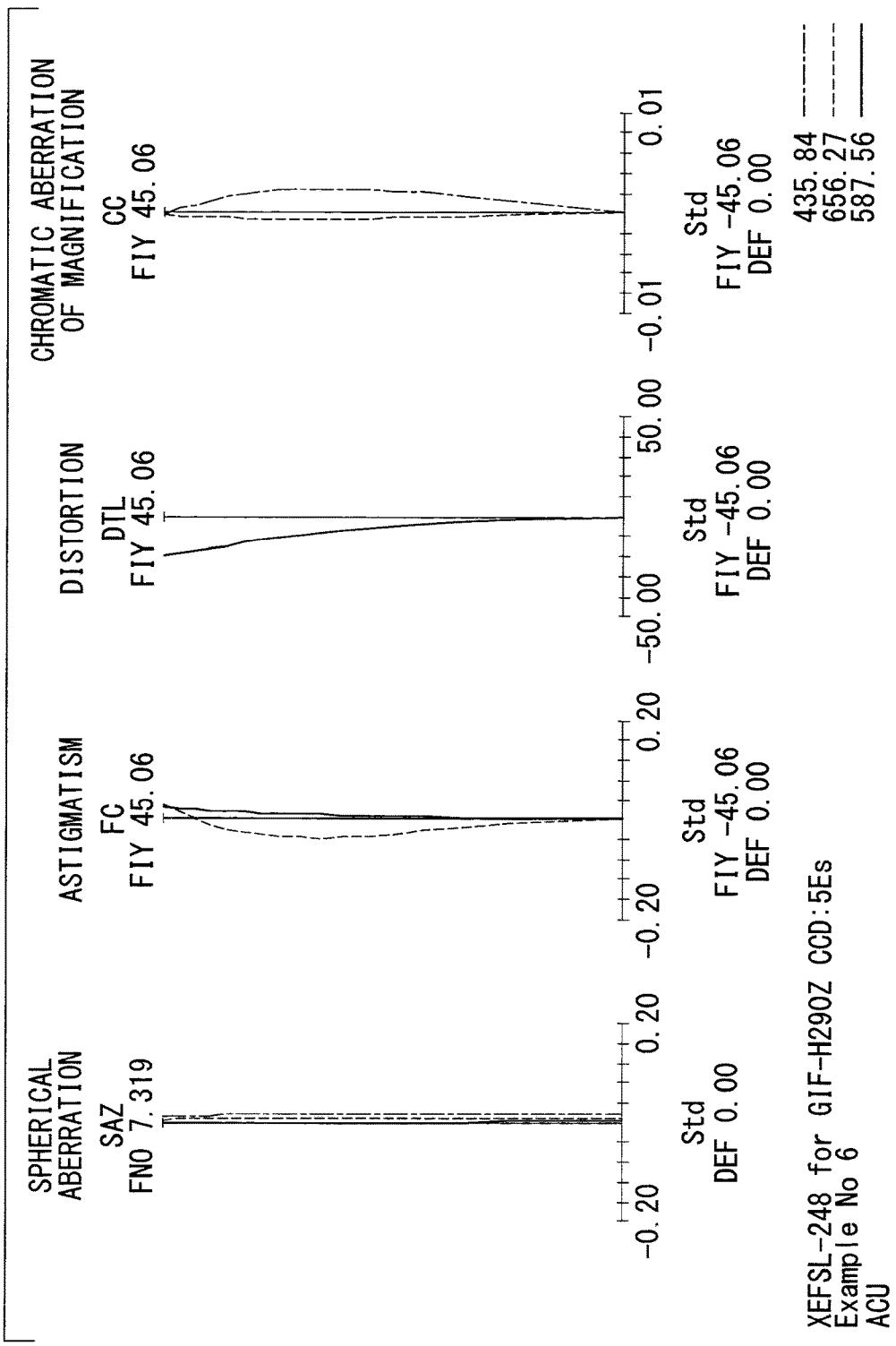
FIG. 40 shows graphs of aberrations in the magnified view state in the objective optical system according to Example 15 of the present invention.

FIG. 38 shows a cross-sectional view of the overall configuration of an objective optical system according to Example 15 of the present invention, FIGS. 39 and 40 show aberration charts, and lens data of the objective optical system according Example 15 is shown below.

Lens data

| Surface Number | r | d | Nd | Vd |
|---|---|---|---|---|
| 1 | ∞ | 0.35 | 1.88300 | 40.76 |
| 2 | 1.108 | 1.17 | | |
| 3 | −2.100 | 1.64 | 1.72916 | 54.68 |
| 4 | −2.340 | 0.05 | | |
| 5 | 5.895 | 1.03 | 1.77250 | 49.60 |
| 6 | −2.751 | 0.34 | 1.95906 | 17.47 |
| 7 | −4.576 | 0.20 | | |
| 8 | aperture stop | 0.03 | | |
| 9 | −17.951 | 0.30 | 1.77250 | 49.60 |
| 10 | 1.424 | 0.50 | 1.59270 | 35.31 |
| 11 | 22.538 | 1.90 | | |
| 12 | 4.648 | 1.40 | 1.48749 | 70.23 |
| 13 | −3.193 | 0.05 | | |
| 14 | 5.299 | 1.70 | 1.48749 | 70.23 |
| 15 | −2.130 | 0.24 | 1.95906 | 17.47 |
| 16 | −5.590 | 1.38 | | |
| 17 | ∞ | 0.75 | 1.51633 | 64.14 |
| 18 | ∞ | 0.01 | 1.51300 | 64.01 |
| 19 | ∞ | 0.65 | 1.50510 | 63.26 |
| 20 | ∞ | | | |

Zoom data

| | Normal View state | Magnified view state |
|---|---|---|
| Focal length | 1.10 | 1.40 |
| FNO. | 7.55 | 7.32 |
| Angle of observation field 2ω | 159.99 | 90.12 |

Various data

| | | |
|---|---|---|
| D7 | 0.20 | 1.80 |
| D11 | 1.90 | 0.30 |

Focal length of each group

| First group | Second group | Third group |
|---|---|---|
| 2.06 | −5.05 | 3.40 |

The values according to the aforementioned expressions (1) through (10) are shown in Table 1 and Table 2.

TABLE 1

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| vA − ndA | 15.51 | 15.51 | 15.51 | 15.51 | 15.51 | 15.51 | 15.51 | 15.51 | 15.51 |
| rdyA1/ih | −1.24 | −2.47 | −2.49 | −2.47 | −1.97 | −2.06 | −2.42 | −1.78 | −1.78 |
| (rdyA1 + rdyA2)/(rdyA1 − rdyA2) | −2.27 | −0.51 | −0.41 | −0.49 | −2.99 | −2.39 | −2.34 | −2.30 | −1.97 |
| rdy12/rdyA1 | −0.57 | −0.41 | −0.40 | −0.40 | −0.48 | −0.48 | −0.96 | −0.53 | −0.53 |
| FL2G * 2Δ/fl^2 | — | 4.48 | 4.52 | 4.48 | — | — | 155.21 | — | — |
| DB/DA | 2.83 | 4.37 | 4.37 | 4.37 | 3.53 | 3.12 | 2.96 | 3.00 | 3.75 |
| DA/ih | 0.46 | 0.30 | 0.30 | 0.30 | 0.67 | 0.56 | 0.67 | 0.45 | 0.45 |
| PW1/PW4 | 2.97 | 1.68 | 1.59 | 1.69 | 4.56 | 3.59 | 1.76 | 3.09 | 2.72 |
| (rdy11 + rdy12)/(rdy11 − rdy12) | 1.00 | 1.00 | 1.00 | 1.00 | 1.00 | 1.00 | 1.00 | 1.00 | 1.00 |
| (rdyB1 + rdyB2)/(rdyB1 − rdyB2) | 0.45 | 0.17 | 0.14 | 0.16 | 0.37 | 0.26 | 0.45 | 0.33 | 0.32 |

TABLE 2

|  | EXAMPLE 10 | EXAMPLE 11 | EXAMPLE 12 | EXAMPLE 13 | EXAMPLE 14 | EXAMPLE 15 |
|---|---|---|---|---|---|---|
| vA − ndA | 15.51 | 15.51 | 15.51 | 15.51 | 15.51 | 15.51 |
| rdyA1/ih | −2.11 | −2.11 | −2.18 | −1.85 | −1.85 | −1.85 |
| (rdyA1 + rdyA2)/(rdyA1 − rdyA2) | −1.28 | −1.09 | −1.06 | −2.20 | −2.20 | −2.23 |
| rdy12/rdyA1 | −1.69 | −1.69 | −1.75 | −1.92 | −1.92 | −1.92 |
| FL2G * 2∆/fl^2 | — | — | — | 5.91 | 5.91 | 6.03 |
| DB/DA | 3.27 | 3.27 | 3.27 | 7.00 | 7.00 | 7.00 |
| DA/ih | 0.61 | 0.61 | 0.61 | 0.21 | 0.21 | 0.21 |
| PW1/PW4 | 1.81 | 1.64 | 1.67 | 2.93 | 2.93 | 2.96 |
| (rdy11 + rdy12)/(rdy11 − rdy12) | 1.00 | 1.00 | 1.00 | 1.00 | 1.00 | 1.00 |
| (rdyB1 + rdyB2)/(rdyB1 − rdyB2) | 0.15 | 0.14 | 0.15 | 0.42 | 0.42 | 0.43 |

The inventors have arrived at the following aspects of the invention.

One aspect of the present invention is an endoscope objective optical system including at least a first cemented lens which has a positive lens and a negative lens, in which the cemented lens satisfies the following conditional expressions, $$15.0 < vA - ndA < 15.75 \quad (1)$$

$$-0.2 > rdyA1/ih > -20 \quad (2)$$

wherein vA is an Abbe number of the negative lens, ndA is a refractive index of the negative lens at the d-line, rdyA1 is a curvature radius of a joining surface of the negative lens, and ih is an image height.

According to this aspect, axial chromatic aberration and chromatic aberration of magnification can be favorably corrected using at least the first cemented lens that has the positive lens and the negative lens and that satisfies the conditional expression (1) and the conditional expression (2) simultaneously.

In the above-described aspect, it is preferable that the negative lens of the first cemented lens satisfies the following conditional expression, $$-0.2 > (rdyA1 + rdyA2)/(rdyA1 - rdyA2) > -10 \quad (3)$$

wherein rdyA1 is a curvature radius of the joining surface of the negative lens of the first cemented lens, and rdyA2 is a curvature radius of an air-contacting surface of the negative lens of the first cemented lens.

By doing so, axial and non-axial chromatic aberrations can be corrected while still achieving the necessary negative refracting power.

It is preferable that the optical system of the above-described aspect has a front lens group, an aperture stop, and a rear lens group arranged in this order from an object, that the rear lens group has a positive refractive index, and that the first cemented lens is disposed in at least one of the front lens group and the rear lens group.

By doing so, the number of lenses of each group can be reduced, the overall length of the endoscope objective optical system can be shortened, and the cost can be reduced. In addition, a long back focus can be secured while still restraining the size in the lens radial direction. Furthermore, axial chromatic aberration and chromatic aberration of magnification can be favorably corrected by providing the cemented lens in at least one of the front lens group and the rear lens group.

In the above-described aspect, it is preferable that the front lens group includes a negative lens and a positive lens arranged in this order from the object and that the rear lens group includes the first cemented lens.

By doing so, the number of lenses of each group can be reduced, the overall length of the endoscope objective optical system can be shortened, and the cost can be reduced. In addition, a long back focus can be secured while still restraining the size in the lens radial direction. In addition, axial chromatic aberration and chromatic aberration of magnification can be favorably corrected by providing the cemented lens in the rear lens group.

In the above-described aspect, it is preferable that the rear lens group has a plurality of the first cemented lenses.

By doing so, the number of lenses of each group can be reduced, the overall length of the endoscope objective optical system can be shortened, and the cost can be reduced. In addition, a long back focus can be secured while still restraining the size in the lens radial direction. Furthermore, axial chromatic aberration and chromatic aberration of magnification can be favorably corrected by providing the cemented lens in the rear lens group.

In the above-described aspect, it is preferable that the front lens group has a negative lens and a cemented lens formed by joining at least one positive lens and at least one negative lens arranged in this order from the object, that the rear lens group has a plurality of the cemented lenses, and that the first cemented lens is provided in at least one of the front lens group and the rear lens group.

By doing so, the number of lenses of each group can be reduced, the overall length of the endoscope objective optical system can be shortened, and the cost can be reduced. In addition, a long back focus can be secured while still restraining the size in the lens radial direction. Furthermore, axial chromatic aberration and chromatic aberration of magnification can be favorably corrected by providing the cemented lens in the rear lens group.

In the above-described aspect, it is preferable that the front lens group has a negative lens and a cemented lens formed by joining at least one positive lens and at least one negative lens arranged in this order from the object, that the rear lens group has the cemented lens and a positive lens, and that at least one of the front lens group and the rear lens group has the first cemented lens.

By doing so, the number of lenses of each group can be reduced, the overall length of the endoscope objective optical system can be shortened, and the cost can be reduced. In addition, a long back focus can be secured while still restraining the size in the lens radial direction. Furthermore, axial chromatic aberration and chromatic aberration of magnification can be favorably corrected by providing the cemented lens in the rear lens group. Furthermore, by providing the positive lens closest to the image side, the exit ray angle can be made gentle, thereby making it possible to correct shading favorably.

In the above-described aspect, it is preferable that the optical system includes a positive first lens group, a movable negative second lens group, and a positive third lens group arranged in this order from an object, that it is possible to switch between a normal view and a magnified view by moving the second lens group, and that the third lens group includes the at least one first cemented lens.

By doing so, the number of lenses of each group can be reduced, the overall length of the endoscope objective optical system can be shortened, and the cost can be reduced, while still ensuring a wide angle of observation field and making it possible to achieve a good focus between the range from the normal view to the magnified view.

In the above-described aspect, it is preferable that the optical system includes a negative first lens group, a second lens group movable at the time of focusing, and a positive third lens group arranged in this order from an object, that it is possible to switch between a normal view and a magnified view by moving the second lens group, and that the third lens group has the at least one first cemented lens.

By doing so, a variation in aberration at the time of focusing can be reduced while still ensuring a long back focus, making it possible to produce an objective optical system that is tolerant to manufacturing errors. In addition, axial chromatic aberration and chromatic aberration of magnification can be favorably corrected as a result of the at least one cemented lens being disposed in the third lens group. It is preferable that the second lens group has positive refracting power or negative refracting power.

In the above-described aspect, it is preferable that the negative first lens is disposed closest to the object and satisfies the following conditional expression, $$-3.0 < rdy12/rdyA1 < -0.2 \qquad (4)$$

wherein rdy12 is an image-side curvature radius of the negative first lens, and rdyA1 is a curvature radius of a joining surface of the negative lens of the first cemented lens.

The conditional expression (4) is a conditional expression for the image-side curvature radius of the negative first lens and the curvature radius of the cemented lens. By satisfying the conditional expression (4), it is possible to favorably maintain the balance between the image-side curvature radius of the negative first lens and the curvature radius of the cemented lens, making it possible to favorably correct comatic aberration, field curvature, axial chromatic aberration, and chromatic aberration of magnification.

In the above-described aspect, it is preferable that the first cemented lens satisfies the following conditional expressions, $$1.0 < DB/DA < 10 \qquad (5)$$

$$0.1 < DA/ih < 2.0 \qquad (6)$$

wherein DA is a thickness at the middle of the negative lens in the first cemented lens, DB is a thickness at the middle of the positive lens in the first cemented lens, and ih is an image height.

The conditional expression (5) and conditional expression (6) are conditional expressions regarding the thickness at the middle of the cemented lens. By satisfying the conditional expression (5) and conditional expression (6), it is possible to achieve an endoscope objective optical system with an appropriate overall length in which the lenses do not easily exhibit manufacturing defects, such as fracture and cracks.

In the above-described aspect, it is preferable that the following conditional expression is satisfied, $$0.5 < PW1/PW4 < 10 \qquad (7)$$

Wherein, PW1 is a refracting power of the negative first lens, and PW4 is a refracting power of the negative lens in the first cemented lens.

By satisfying the conditional expression (7), it is possible to favorably maintain the balance between the refracting power of the negative first lens and the refracting power of the negative lens of the first cemented lens, making it possible to favorably correct comatic aberration, field curvature, axial chromatic aberration, and chromatic aberration of magnification.

In the above-described aspect, it is preferable that the following conditional expression is satisfied, $$0.5 < (rdy11+rdy12)/(rdy11-rdy12) < 1.7 \qquad (8)$$

wherein rdy11 is an object-side curvature radius of the negative first lens.

The necessary negative refracting power can be obtained by satisfying the conditional expression (8).

In the above-described aspect, it is preferable that the following conditional expression is satisfied, $$0.05 < (rdyB1+rdyB2)/(rdyB1-rdyB2) < 2.0 \qquad (9)$$

wherein rdyB1 is a curvature radius of an air-contacting surface of the positive lens in the first cemented lens, and rdyB2 is a curvature radius of a joining surface of the positive lens in the first cemented lens.

By satisfying the conditional expression (9), an appropriate curvature radius can be derived, and the thickness of the lens at the periphery thereof can be secured while still ensuring the necessary positive refracting power.

In the above-described aspect, it is preferable that the following conditional expression is satisfied, $$1 < FL2G \times \Delta 2G/FL^2 < 200 \qquad (10)$$

wherein $\Delta 2G$ is an absolute value of displacement of the second lens group from a normal view state to a close-up magnified view state, FL is a focal length of the entire objective optical system in the normal view state, and FL2G is a focal length of the second lens group.

By satisfying the conditional expression (10), an appropriate displacement can be performed and a focus stroke in accordance with technician's feeling can be realized.

ADVANTAGEOUS EFFECTS OF INVENTION

The aforementioned aspects affords an advantage in that an image having high precision and a wide angle of observation field can be obtained by favorably correcting various aberrations while ensuring low invasiveness.

REFERENCE SIGNS LIST

G1 first group
G2 second group
L1 first lens
L2 second lens
L3 third lens
L4 fourth lens
L5 fifth lens
L6 sixth lens
L7 seventh lens
CL1 cemented lens

The invention claimed is:

1. An endoscope objective optical system comprising a negative first lens group, a positive second lens group movable at the time of focusing, an aperture stop which does not move at the time of focusing, and a positive third lens group which does not move at the time of focusing, arranged in this order from an object, wherein the optical system is capable of switching between a normal view state and a magnified view state by moving the second lens group along an optical axis, and the third lens group includes at least one cemented lens, wherein the cemented lens includes a positive lens and a negative lens cemented to the positive lens, wherein the cemented lens satisfies the following conditional expressions, $$15.0 < \nu A - ndA < 15.75 \tag{1}$$

$$-0.2 > rdyA1/ih > -20 \tag{2}$$

wherein νA is an Abbe number of the negative lens, ndA is a refractive index of the negative lens at the d-line, rdyA1 is a curvature radius of a joining surface of the negative lens, and ih is an image height.

2. The endoscope objective optical system according to claim 1, wherein the cemented lens satisfies the following conditional expressions, $$1.0 < DB/DA < 10 \tag{5}$$

$$0.1 < DA/ih < 2.0 \tag{6}$$

wherein DA is a thickness at the middle of the negative lens in the cemented lens, DB is a thickness at the middle of the positive lens in the cemented lens, and ih is an image height.

3. The endoscope objective optical system according to claim 1, wherein the optical system satisfies the following conditional expression, $$1 < FL2G \times \Delta 2G/FL^2 < 200 \tag{10}$$

wherein Δ2G is an absolute value of displacement of the second lens group from a normal view state to a close-up magnified view state, FL is a focal length of the entire objective optical system in the normal view state, and FL2G is a focal length of the second lens group.

* * * * *